(12) United States Patent
Furuta

(10) Patent No.: US 10,852,657 B2
(45) Date of Patent: Dec. 1, 2020

(54) IMAGE FORMING APPARATUS

(71) Applicant: CANON KABUSHIKI KAISHA, Tokyo (JP)

(72) Inventor: Yasutomo Furuta, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/433,449

(22) Filed: Jun. 6, 2019

(65) Prior Publication Data

US 2019/0384205 A1     Dec. 19, 2019

(30) Foreign Application Priority Data

Jun. 18, 2018   (JP) ................................. 2018-115230

(51) Int. Cl.
   *G03G 15/04*     (2006.01)
   *H04N 1/387*     (2006.01)
   *G03G 15/043*    (2006.01)

(52) U.S. Cl.
   CPC ..... *G03G 15/04045* (2013.01); *G03G 15/043* (2013.01); *H04N 1/3877* (2013.01)

(58) Field of Classification Search
   CPC ....... G03G 15/04045; G03G 15/04054; G03G 15/043; H04N 1/3877; H04N 1/3935
   See application file for complete search history.

(56) References Cited

U.S. PATENT DOCUMENTS

| 6,205,259 | B1* | 3/2001 | Komiya | .................... | G06T 5/50 |
|           |     |        |        |                      | 382/284   |
| 8,482,588 | B2  | 7/2013 | Miyadera et al. | | |
| 9,558,430 | B2  | 1/2017 | Furuta | | |
| 2007/0126881 | A1* | 6/2007 | Kondo | ................... | G06T 3/4007 |
|           |     |        |        |                      | 348/208.1 |
| 2009/0323095 | A1* | 12/2009 | Tanimoto | ............. | H04N 1/3871 |
|           |     |        |        |                      | 358/1.13 |

(Continued)

FOREIGN PATENT DOCUMENTS

| EP | 2 541 332 A2 | 1/2013 |
| JP | 2002-120390 A | 4/2002 |
| JP | 5691330 B2 | 4/2015 |

OTHER PUBLICATIONS

UK Search Report dated Dec. 6, 2019, in UK Patent Application No. GB 1908149.6.

*Primary Examiner* — Francis C Gray
(74) *Attorney, Agent, or Firm* — Venable LLP

(57) ABSTRACT

An image forming apparatus includes an exposure head including light emitting elements arranged in an intersecting direction intersecting with a rotation direction of a photosensitive member to form an image at a first resolution corresponding the light emitting elements in the intersecting direction; a data generating unit configured to generate pixel data corresponding to a second resolution higher than the first resolution associating with positions of the pixel data; a correction unit configured to correct associations between the positions and the pixel data to adjust a position of an image in the intersecting direction; a conversion unit configured to convert the pixel data corresponding to the second resolution to pixel data corresponding to the first resolution; and a drive unit configured to drive the light emitting elements based on the pixel data corresponding to the first resolution.

11 Claims, 18 Drawing Sheets

(56) References Cited

U.S. PATENT DOCUMENTS

| | | | | |
|---|---|---|---|---|
| 2010/0302384 A1* | 12/2010 | Sawada | ............ | H04N 5/23248 |
| | | | | 348/208.4 |
| 2011/0199534 A1* | 8/2011 | Kawai | ................ | G02B 7/365 |
| | | | | 348/345 |
| 2014/0055650 A1* | 2/2014 | Hiramoto | ............. | H04N 9/045 |
| | | | | 348/280 |
| 2015/0350491 A1* | 12/2015 | Iwata | ............... | G03G 15/043 |
| | | | | 358/475 |
| 2016/0085172 A1* | 3/2016 | Horiuchi | ........ | G03G 15/04072 |
| | | | | 347/118 |

* cited by examiner

FIG. 9A

|     | PWM DATA | | | | | | | |
|-----|---|---|---|---|---|---|---|---|
| 000 | 0 | 0 | 0 | 0 | 0 | 0 | 0 | 0 |
| 001 | 0 | 0 | 0 | 0 | 0 | 0 | 1 | 1 |
| 010 | 0 | 0 | 0 | 0 | 1 | 1 | 1 | 1 |
| 011 | 0 | 0 | 1 | 1 | 1 | 1 | 1 | 1 |
| 100 | 1 | 1 | 1 | 1 | 1 | 1 | 1 | 1 |

FIG. 9B

|     | PWM DATA | | | | | | | |
|-----|---|---|---|---|---|---|---|---|
| 000 | 0 | 0 | 0 | 0 | 0 | 0 | 0 | 0 |
| 001 | 1 | 1 | 0 | 0 | 0 | 0 | 0 | 0 |
| 010 | 1 | 1 | 1 | 1 | 0 | 0 | 0 | 0 |
| 011 | 1 | 1 | 1 | 1 | 1 | 1 | 0 | 0 |
| 100 | 1 | 1 | 1 | 1 | 1 | 1 | 1 | 1 |

FIG. 9C

|     | PWM DATA | | | | | | | |
|-----|---|---|---|---|---|---|---|---|
| 000 | 0 | 0 | 0 | 0 | 0 | 0 | 0 | 0 |
| 001 | 0 | 0 | 0 | 1 | 1 | 0 | 0 | 0 |
| 010 | 0 | 0 | 1 | 1 | 1 | 1 | 0 | 0 |
| 011 | 0 | 1 | 1 | 1 | 1 | 1 | 1 | 0 |
| 100 | 1 | 1 | 1 | 1 | 1 | 1 | 1 | 1 |

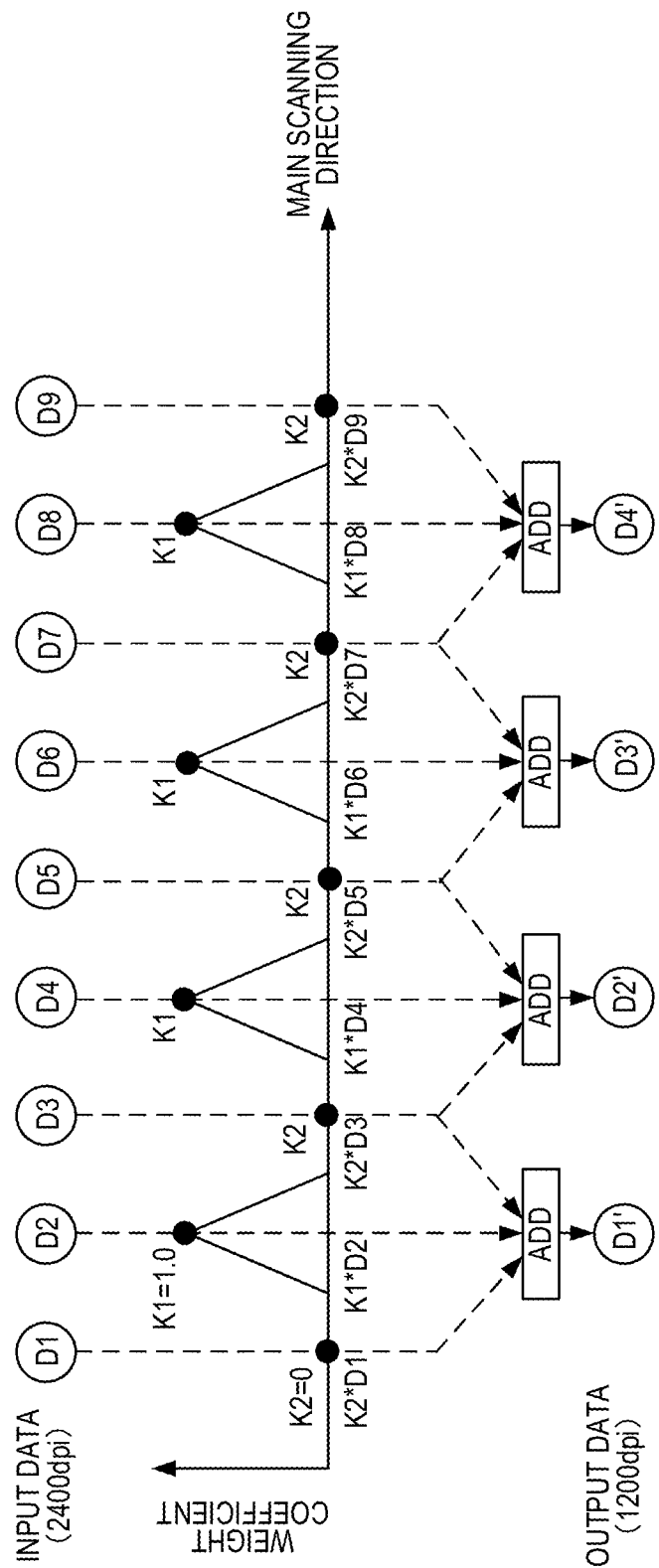

IMAGE FORMING APPARATUS

BACKGROUND OF THE INVENTION

Field of the Invention

The present invention relates to image forming apparatus that uses an electrophotographic process.

Description of the Related Art

A method in which a photosensitive drum is exposed using an exposure head to form a latent image on the photosensitive drum is generally known as a method adopted in a printer that is an image forming apparatus that uses an electrophotographic process. LEDs (light emitting diodes) or organic ELs (organic electro-luminescence) or the like are used in the exposure head. The exposure head includes rows of light emitting elements that are arranged in the longitudinal direction of the photosensitive drum, and a rod lens array that forms an image of light from the rows of light emitting elements on the photosensitive drum. Known configurations of LEDs or organic ELs include a configuration in which the LED or organic EL has a surface-light emitting shape such that the direction of light radiation from the light emitting surface is the same direction as the rod lens array. The length of the light emitting element rows is decided according to the width of an image region on the photosensitive drum, and the interval between the light emitting elements is decided according to the resolution of the printer. For example, in the case of a printer having a resolution of 1200 dpi, the interval between pixels is 21.16 μm, and therefore the interval between light emitting elements is also an interval that corresponds to 21.16 μm. In a printer that uses this kind of exposure head, because the number of components that are used is less than in a printer that adopts a laser scanning method in which a laser beam that is deflected by a rotating polygon mirror is used to scan a photosensitive drum, it is easy to reduce the size and lower the cost of the device. Further, noise that is generated by rotation of a rotating polygon mirror is not generated in a printer that uses an exposure head, and thus the noise is reduced by a corresponding amount.

In a configuration that uses this kind of exposure head, slanting of images for the respective colors of toner is liable to arise due to variations in the attachment position of the exposure head with respect to the photosensitive drum. To correct such slanting, a method is available that shifts the position of the image data in the rotation direction (sub-scanning direction) of the photosensitive drum. Further, as a method that, when image data is shifted, reduces image defects at the position to which the image was shifted, a method is known which makes the resolution in the sub-scanning direction a high resolution, and causes the image data to be shifted more minutely. Japanese Patent No. 5691330 discloses a method that realizes processing for shifting image data in the sub-scanning direction at a resolution that is a multiple of N of the resolution of image data in the main scanning direction using a simpler configuration.

In the above-described methods according to the conventional technology, although the correction resolution in the sub-scanning direction can be enhanced, there is a problem that the accuracy with respect to correcting the position in the arrangement direction (main scanning direction) of the surface emitting elements of the exposure head cannot be enhanced. In the exposure head, the exposure position of the respective light emitting elements in the main scanning direction sometimes deviates from a desired position due to variations in the attachment positions with respect to a drive board among a plurality of chips that include surface emitting elements or due to thermal expansion caused by an increase in the temperature of the drive board. Therefore, highly precise correction control is also required with respect to the main scanning direction, similarly to the sub-scanning direction. On the other hand, the surface emitting elements are disposed at intervals (for example, in the case of 1200 dpi, an interval of 21.16 μm) that are determined in advance according to the semiconductor process. Therefore, in the case of a method that simply shifts image data, there is the problem that position correction cannot be performed at a resolution that is higher than the interval between the elements.

SUMMARY OF THE INVENTION

The present invention has been made in consideration of the above described situation, and the present invention suppresses the occurrence of a decrease in image quality by correcting image data that corresponds to a higher resolution than the arrangement interval of light emitting elements in the arrangement direction of the light emitting elements.

To solve the aforementioned problems, an image forming apparatus according to one embodiment of the present invention comprises:

a photosensitive member which is rotatable;

an exposure head including a plurality of light emitting elements, which are arranged at different positions to each other in an intersecting direction intersecting with a rotation direction of the photosensitive member and which expose the photosensitive member, wherein the exposure head is configured to form an image at a first resolution corresponding to an arrangement interval of the plurality of light emitting elements in the intersecting direction;

a data generating unit configured to generate pixel data based on input image data while associating the pixel data corresponding to respective pixels that correspond to a second resolution higher than the first resolution with positions of the pixel data in the intersecting direction;

a correction unit configured to correct associations between the positions and a plurality of pieces of the pixel data generated by the data generating unit in order to adjust a formation position of an image in the intersecting direction;

a conversion unit configured to convert the plurality of pieces of pixel data, that correspond to the second resolution, corrected by the correction unit to pixel data of pixels, that correspond to the first resolution, corresponding to the positions of the plurality of pieces of pixel data; and a drive unit configured to drive each of the plurality of light emitting elements corresponding to a position of each piece of the pixel data that corresponds to the first resolution, based on the pixel data of each pixel, that corresponds to the first resolution, converted by the conversion unit.

Further features of the present invention will become apparent from the following description of exemplary embodiments with reference to the attached drawings.

BRIEF DESCRIPTION OF THE DRAWINGS

FIG. 9A, FIG. 9B and FIG. 9C are conversion tables illustrating examples of a look-up-table according to Embodiment 1.

FIG. 14 is a view for describing filter processing in Embodiment 2.

DESCRIPTION OF THE EMBODIMENTS

The embodiments will be described in detail in accordance with the accompanying drawings.

Embodiment 1

[Configuration of Image Forming Apparatus]

Figure 1:
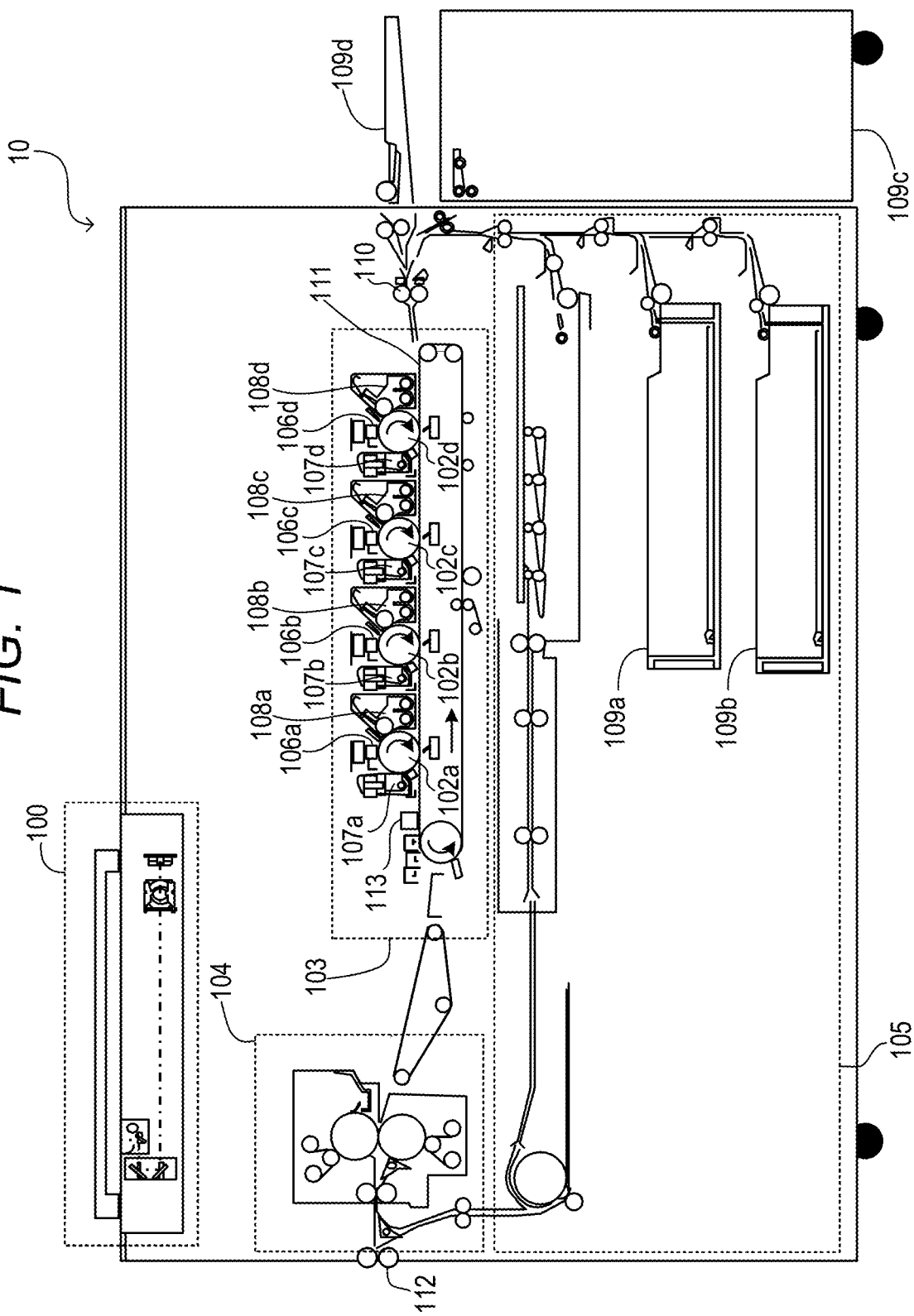
FIG. 1 is a schematic cross-sectional view illustrating the configuration of an image forming apparatus according to Embodiments 1 and 2.

FIG. 1 is a schematic cross-sectional view illustrating the configuration of an image forming apparatus 10 which uses an electrophotographic process according to Embodiment 1. The image forming apparatus 10 illustrated in FIG. 1 is a multi-function peripheral (MFP) that includes a scanner function and a printer function, and includes a scanner portion 100, an image forming portion 103, a fixing portion 104, a feeding/conveying portion 105, and a printer controller (not illustrated) that controls the aforementioned portions. The scanner portion 100 irradiates an illumination light onto an original placed on an original platen, and converts an image that is read into electric signals to create image data.

The image forming portion 103 includes four image forming stations which are arranged in the order of cyan (C), magenta (M), yellow (Y) and black (K) along the rotation direction (counter-clockwise direction) of an endless conveying belt 111. The four image forming stations have the same configuration, with each image forming station including a photosensitive drum 102 that is a photosensitive member which rotates in the arrow direction (clockwise direction), an exposure head 106, a charging device 107 and a developing device 108. Note that the suffixes a, b, c and d with respect to the photosensitive drums 102, the exposure heads 106, the charging devices 107 and the developing devices 108 denote that the relevant components are included in the configurations corresponding to the black (K), yellow (Y), magenta (M) and cyan (C) image forming stations, respectively. Note that, hereunder, the suffixes of the reference characters are omitted except in the case of indicating a specific photosensitive drum or the like.

In the image forming portion 103, the photosensitive drum 102 is rotationally driven, and the photosensitive drum 102 is charged by the charging device 107. In the exposure head 106 which is an exposure unit, an LED array that is arranged therein emits light in accordance with image data, and light emitted from a chip surface of the LED array is converged onto the photosensitive drum 102 (onto a photosensitive member) by a rod lens arrays to form an electrostatic latent image. The developing device 108 uses toner to develop an electrostatic latent image formed on the photosensitive drum 102. The developed toner image is transferred onto recording paper that is on the conveying belt 111 that conveys recording paper. This series of electrophotographic processes is executed at each image forming station. Note that, when forming an image, image formation is started at the image forming station for cyan (C), and after a predetermined time period has passed, image forming operations are executed in sequence at the respective image forming stations for magenta (M), yellow (Y) and black (K).

The image forming apparatus 10 illustrated in FIG. 1 includes, as feeding units that feed recording paper, main-body internal feeding units 109a and 109b which the feeding/conveying portion 105 includes, an external feeding unit 109c that is a large-capacity feeding unit, and a manual feeding unit 109d. When performing image formation, recording paper is fed from a previously designated feeding unit among the aforementioned feeding units, and the thus-fed recording paper is conveyed to registration rollers 110. The registration rollers 110 convey the recording paper to the conveying belt 111 at a timing such that the toner images formed in the aforementioned image forming portion 103 will be transferred onto the recording paper. The toner images formed on the photosensitive drums 102 of the respective image forming stations are sequentially transferred on the recording paper conveyed by the conveying belt 111. The recording paper onto which unfixed toner images have been transferred is conveyed to the fixing portion 104. The fixing portion 104 includes a built-in heat source such as a halogen heater, and causes the toner images that are on the recording paper to be fixed to the recording paper by heating and pressurization by two rollers. The recording paper on which the toner images were fixed by the fixing portion 104 is discharged to outside of the image forming apparatus 10 by discharge rollers 112.

An optical sensor 113 that is a detection unit is disposed at a position facing the conveying belt 111 on the downstream side in the recording paper conveying direction of the image forming station for black (K). The optical sensor 113 performs position detection with respect to a test image formed on the conveying belt 111 for determining the amount of color misregistration of toner images between the respective image forming stations. The amount of color misregistration that is determined by the optical sensor 113 is notified to a CPU 400 of a control board 415 that is described later (see FIG. 4), and the positions of the images of the respective colors are corrected so that a full-color toner image with no color misregistration is transferred onto the recording paper. Further, in accordance with an instruction from an MFP controller (not illustrated) that controls the entire multi-function peripheral (MFP), a printer controller (not illustrated) executes an image forming operation while controlling the scanner portion 100, the image forming portion 103, the fixing portion 104, and the feeding/conveying portion 105 and the like that are described above.

The image forming apparatus 10 that adopts a system that directly transfers toner images formed on the photosensitive drums 102 of the respective image forming stations onto a recording paper on the conveying belt 111 is described here as an example of the image forming apparatus 10 that uses an electrophotographic process. The present invention is not limited to a printer that adopts the aforementioned kind of system that directly transfers toner images formed on the photosensitive drums 102 onto recording paper. For example, the present invention can also be applied to an image forming apparatus that includes a primary transfer portion configured to transfer toner images formed on the photosensitive drums 102 onto an intermediate transfer belt, and a secondary transfer portion configured to transfer toner images on the intermediate transfer belt onto a recording paper.

[Configuration of Exposure Head]

Figure 2A:
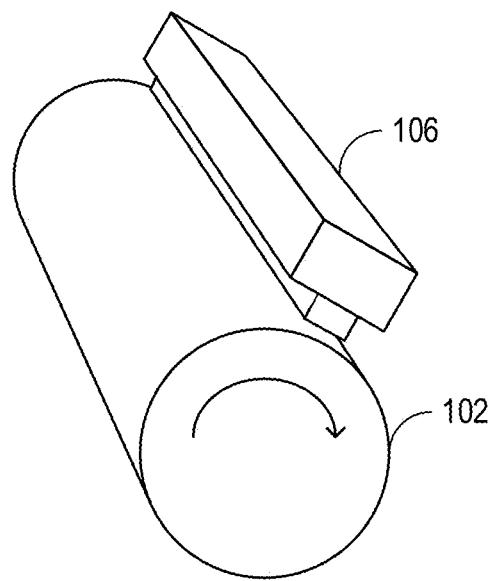
FIG. 2A is a view for describing the positional relation between an exposure head and a photosensitive drum in Embodiments 1 and 2.
Figure 2B:
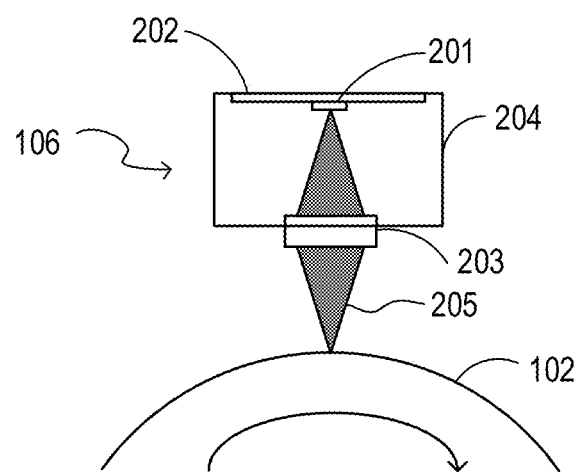
FIG. 2B is a view for describing the configuration of the exposure head.

Next, the exposure head 106 that exposes the photosensitive drum 102 will be described referring to FIG. 2A and FIG. 2B. FIG. 2A is a perspective view illustrating the positional relation between the exposure head 106 and the photosensitive drum 102. FIG. 2B is a view for describing the internal configuration of the exposure head 106, and a state in which a luminous flux 205 from the exposure head 106 is converged onto the photosensitive drum 102 by a rod lens array 203. As illustrated in FIG. 2A, the exposure head 106 is attached (FIG. 1) to the image forming apparatus 10 by an attachment member (not illustrated) at a position facing the photosensitive drum 102 at an upper portion of the photosensitive drum 102 that rotates in the arrow direction.

As illustrated in FIG. 2B, the exposure head 106 includes a drive board 202, a surface-emitting-element-array element group 201 mounted on the drive board 202, the rod lens array 203, and a housing 204. The rod lens array 203 and the drive board 202 are attached to the housing 204. The rod lens array 203 causes the luminous flux 205 from the surface-emitting-element-array element group 201 to converge on the photosensitive drum 102. At the factory, assembly adjustment work is performed in which the exposure head 106 is taken as a single unit, and focus adjustment and light amount adjustment for each spot are performed. At such time, assembly adjustment is performed so that the distance between the photosensitive drum 102 and the rod lens array 203, and the distance between the rod lens array 203 and the surface-emitting-element-array element group 201 each become a predetermined interval. Thereby, light from the surface-emitting-element-array element group 201 is formed as an image on the photosensitive drum 102. For this reason, when performing focus adjustment at the factory, adjustment of the attachment position of the rod lens array 203 is performed so that the distance between the rod lens array 203 and the surface-emitting-element-array element group 201 becomes a predetermined value. Further, when performing light amount adjustment at the factory, the respective light emitting elements of the surface-emitting-element-array element group 201 are caused to emit light in sequence, and adjustment of the driving current of each light emitting element is performed so that the light that is converged on the photosensitive drum 102 through the rod lens array 203 becomes a predetermined light amount.

[Configuration of Surface-Emitting-Element-Array Element Group]

Figure 3A:
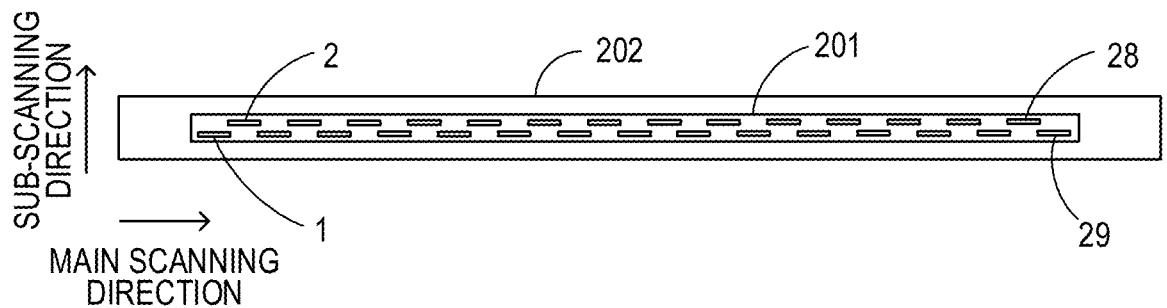
FIG. 3A and FIG. 3B are schematic diagrams of a drive board according to Embodiments 1 and 2.
Figure 3B:
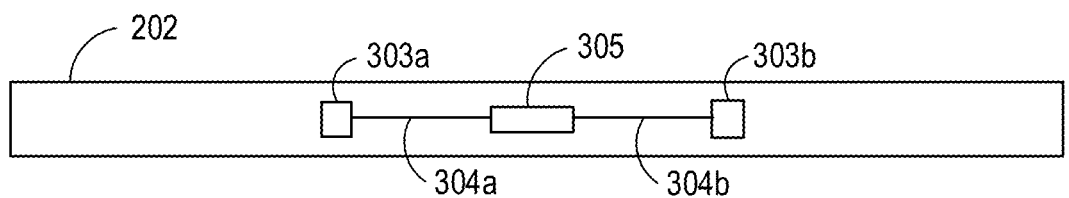
Figure 3C:
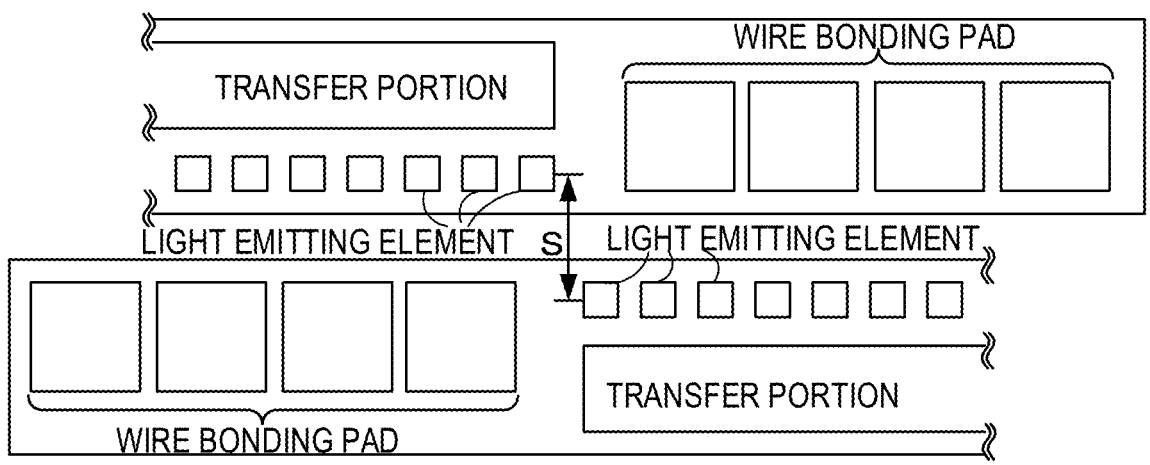
FIG. 3C is a view for describing the configuration of a surface emitting element array chip.

FIGS. 3A, 3B and 3C are views for describing the surface-emitting-element-array element group 201. FIG. 3A is a schematic diagram illustrating the configuration of a face on which the surface-emitting-element-array element group 201 of the drive board 202 is mounted. FIG. 3B is a schematic diagram illustrating the configuration of a face (second face) on an opposite side to the face (first face) on which the surface-emitting-element-array element group 201 of the drive board 202 is mounted.

As illustrated in FIG. 3A, the surface-emitting-element-array element group 201 that is mounted on the drive board 202 has a configuration in which 29 surface emitting element array chips 1 to 29 are arranged in two rows in a staggered manner along the longitudinal direction of the drive board 202. Note that, in FIG. 3A, the vertical direction represents the sub-scanning direction (rotation direction of the photosensitive drum 102) that is a first direction, and the horizontal direction represents the main scanning direction (longitudinal direction of the exposure head 106) that is a second direction which is perpendicular to the sub-scanning direction. In each of the surface emitting element array chips, the respective elements of the surface emitting element array chip that has a total of 516 light emitting points (light emitting elements) are arranged at a predetermined resolution pitch in the longitudinal direction of the surface emitting element array chip. In the present embodiment, the pitch between each element of the surface emitting element array chip is approximately 21.16 μm (≈2.54 cm/1200 dots) that is the pitch for a resolution of 1200 dpi as a first resolution. As a result, the interval from one end to the other end of the 516 light emitting points inside a single surface emitting element array chip is approximately 10.9 mm (≈21.16 μm×516). The surface-emitting-element-array element group 201 includes 29 surface emitting element array chips. The number of light emitting elements that can be exposed in the surface-emitting-element-array element group 201 is 14,964 elements (=516 elements×29 chips), and thus image formation that corresponds to an image width in the main scanning direction of approximately 316 mm (≈approximately 10.9 mm×29 chips) is enabled.

FIG. 3C is a view illustrating the appearance of a boundary portion between chips with respect to the surface emitting element array chips that are disposed in two rows in the longitudinal direction, in which the horizontal direction is the longitudinal direction of the surface-emitting-element-array element group 201 that is illustrated in FIG. 3A. As illustrated in FIG. 3C, wire bonding pads into which control signals are input are disposed at an end portion of the surface emitting element array chip, and a transfer portion and light emitting elements are driven by signals that are input from the wire bonding pads. The surface emitting element array chip has a plurality of light emitting elements. At the boundary portion between the surface emitting element array chips also, a pitch (interval between the respective center points of two light emitting elements) in the longitudinal direction of the light emitting elements is approximately 21.16 μm that is the pitch for a resolution of 1200 dpi.

Further, the surface emitting element array chips that are arranged in two upper and lower rows are disposed so that an interval (indicated by an arrow S in FIG. 3C) between the light emitting points of the upper and lower surface emitting element array chips is approximately 84 μm (distance that is an integer multiple of each resolution which corresponds to a distance for 4 pixels at 1200 dpi and a distance for 8 pixels at 2400 dpi).

Further, as illustrated in FIG. 3B, driving portions 303a and 303b and a connector 305 are mounted on the face of the drive board 202 that is on the opposite side to the face on which the surface-emitting-element-array element group 201 is mounted. The driving portions 303a and 303b which are disposed on the both sides of the connector 305 are driver ICs that drive the surface emitting element array chips 1 to 15 and the surface emitting element array chips 16 to 29, respectively. The driving portions 303a and 303b are connected to the connector 305 through patterns 304a and 304b, respectively. Signal wires for controlling the driving portions 303a and 303b from the control board 415 (see FIG. 4) that is described later, a power supply voltage, and a ground are connected to the connector 305, and are thereby connected to the driving portions 303a and 303b. Further, wiring for driving the surface-emitting-element-array element group 201 from each of the driving portions 303a and 303b passes through an inner layer of the drive board 202 and is connected to the surface emitting element array chips 1 to 15 and the surface emitting element array chips 16 to 29, respectively.

[Control Configuration of Control Board and Drive Board]

Figure 4:
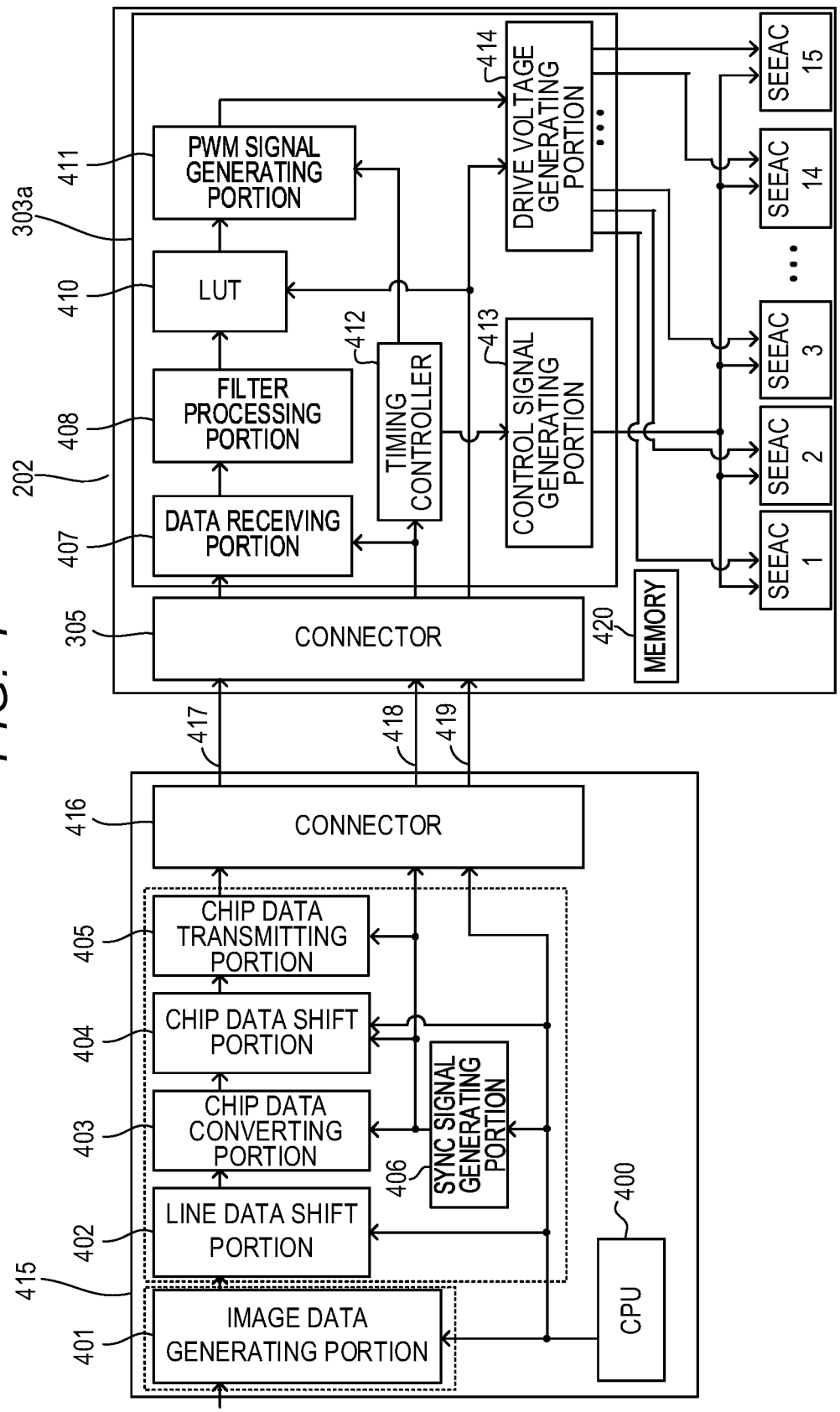
FIG. 4 is a control block diagram of a control board and a drive board according to Embodiments 1 and 2.

FIG. 4 is a control block diagram of the control board 415 that processes image data and outputs the processed image data to the drive board 202 of the exposure head 106, and the drive board 202 of the exposure head 106 that exposes the photosensitive drum 102 based on image data that is input from the control board 415. The drive board 202 will be described with respect to the surface emitting element array chips (SEEAC in FIG. 4) 1 to 15 that are controlled by the driving portion 303a illustrated in FIG. 4. Note that, the surface emitting element array chips 16 to 29 that are controlled by the driving portion 303b (not illustrated in FIG. 4) perform the same operations as the surface emitting element array chips 1 to 15 that are controlled by the driving portion 303a. Further, although only image processing for one color will be described here to simplify the description, similar processing is performed by parallel processing simultaneously for the four colors in the image forming apparatus 10 of the present embodiment. The control board 415 illustrated in FIG. 4 has a connector 416 for transmitting signals for controlling the exposure head 106 to the drive board 202. Image data, a line synchronization signal that is described later, and control signals from the CPU 400 of the control board 415 are transmitted from the connector 416 through cables 417, 418 and 419 that are connected to the connector 305 of the drive board 202.

[Configuration of Control Board]

In the control board 415, processing of image data and processing relating to the timing of printing is performed by the CPU 400. The control board 415 includes functional blocks for an image data generating portion 401, a line data shift portion 402, a chip data converting portion 403, a chip data shift portion 404, a chip data transmitting portion 405 and a sync signal generating portion 406. In the present embodiment it is assumed that the image data generating portion 401 is constituted by a single integrated circuit (IC). Further, it is assumed that the line data shift portion 402, the chip data converting portion 403, the chip data shift portion 404, the chip data transmitting portion 405 and the sync signal generating portion 406 are constituted by a single integrated circuit (IC) that is different from the integrated circuit which has the image data generating portion 401. Note that, the image data generating portion 401, the line data shift portion 402, the chip data converting portion 403, the chip data shift portion 404, the chip data transmitting portion 405 and the sync signal generating portion 406 represent modules within the integrated circuits (IC). The CPU 400 is an integrated circuit that is different from the aforementioned integrated circuits. The CPU 400, the integrated circuit having the image data generating portion 401, and the integrated circuit having the line data shift portion 402 and the like, and the connector 416 are mounted on the control board 415. Note that, the image data generating portion 401, the line data shift portion 402, the chip data converting portion 403, the chip data shift portion 404, the chip data transmitting portion 405 and the sync signal generating portion 406 may be included in a single integrated circuit. Further, the image data generating portion 401, the line data shift portion 402, the chip data converting portion 403, the chip data shift portion 404, the chip data transmitting portion 405, the sync signal generating portion 406 and the CPU 400 may be included in a single integrated circuit. Hereunder, processing performed in each functional block is described in the order in which image data is processed by the control board 415.

(Image Data Generating Portion)

The image data generating portion 401 that is a data generating unit subjects input image data that is received from an external computer which is connected to the scanner portion 100 or the image forming apparatus 10 to dithering processing at a resolution that is instructed by the CPU 400 to thereby generate image data. In the present embodiment it is assumed that the image data generating portion 401 performs dithering processing at a resolution of 2400 dpi which corresponds to a second resolution. That is, the image data which the image data generating portion 401 generates is pixel data corresponding to 2400 dpi. Although it is assumed that the pixel data corresponding to 2400 dpi of the present embodiment is one-bit data, one pixel may be represented by multiple bits. The pixel data which the image data generating portion 401 generates is line data corresponding to lines that correspond to 2400 dpi in the sub-scanning direction (this is the rotation direction of the photosensitive drum 102, and is also the conveying direction of the recording paper). The image data generating portion 401 then generates image data by associating pixel data corresponding to each pixel for which the resolution corresponds to 2400 dpi with the position in the main scanning direction (longitudinal direction of the exposure head 106) of the relevant pixel.

(Line Data Shift Portion)

Based on an amount of color misregistration detected by the optical sensor 113, the CPU 400 determines image shift amounts in the main scanning direction and sub-scanning direction, respectively, in 2400 dpi units. The image shift amount is, for example, determined by the CPU 400 based on the relative amount of color misregistration between colors that is calculated based on a detection result with respect to a pattern image for color misregistration detection obtained by the optical sensor 113. The CPU 400 then indicates an image shift amount to the line data shift portion 402 that is a correction unit. Based on the image shift amount indicated by the CPU 400, the line data shift portion 402 performs shift processing in 2400 dpi units on the image data (also referred to as "line data") that was input from the image data generating portion 401 with respect to the entire image region within one page of the recording paper. Correction of the position at which to form the image is performed by the shift processing. Note that, the line data shift portion 402 may also be configured to divide an image region within one page of the recording paper into a plurality of image regions, and to execute shift processing for each of the plurality of image regions into which the image region within one page was divided.

(Sync Signal Generating Portion)

The sync signal generating portion 406 generates a synchronization signal for one line (hereunder, referred to as a "line synchronization signal") in the rotation direction of the photosensitive drum 102, the synchronization signal being synchronized with the rotational speed of the photosensitive drum 102. The CPU 400 specifies a time period in which the surface of the photosensitive drum 102 moves by an amount corresponding to a pixel size for a resolution of 2400 dpi (approximately, 10.5 μm) in the rotation direction (sub-scanning direction) with respect to a period of the line synchronization signal, that is, with respect to a predetermined rotational speed of the photosensitive drum 102, to the sync signal generating portion 406. For example, in the case of printing at a speed of 200 mm/sec in the sub-scanning direction, the CPU 400 specifies approximately 52.9 μs ($\approx$(25.4 mm/2400 dots)/200 mm) as the period of the line synchronization signal (period for one line in the sub-scanning direction) to the sync signal generating portion 406. In a case where the image forming apparatus has a detection portion configured to detect the rotational speed of the photosensitive drum 102, the CPU 400 calculates the rotational speed of the photosensitive drum 102 in the sub-scanning direction based on a detection result (a period in which a signal that an encoder outputs is generated) of the detection portion, and determines the period of the line synchronization signal based on the result of the calculation. The detection portion in this case is, for example, an encoder that is installed on a rotary shaft of the photosensitive drum. On the other hand, in a case where the image forming apparatus does not have a detection portion that detects the rotational speed of the photosensitive drum 102, the rotational speed of the photosensitive drum 102 is calculated based on the following information. That is, the CPU 400 determines the period of the line synchronization signal based on information relating to the type of paper which the user inputs from an operation portion, such as the grammage ($g/cm^2$) of the sheets and the sheet size.

(Chip Data Converting Portion)

In synchronization with the line synchronization signal, the chip data converting portion 403 reads out line data in the sub-scanning direction of the photosensitive drum 102, line by line, from the line data shift portion 402. The chip data converting portion 403 then executes data processing that divides the line data that was read out into line data for each chip.

Figure 5A:
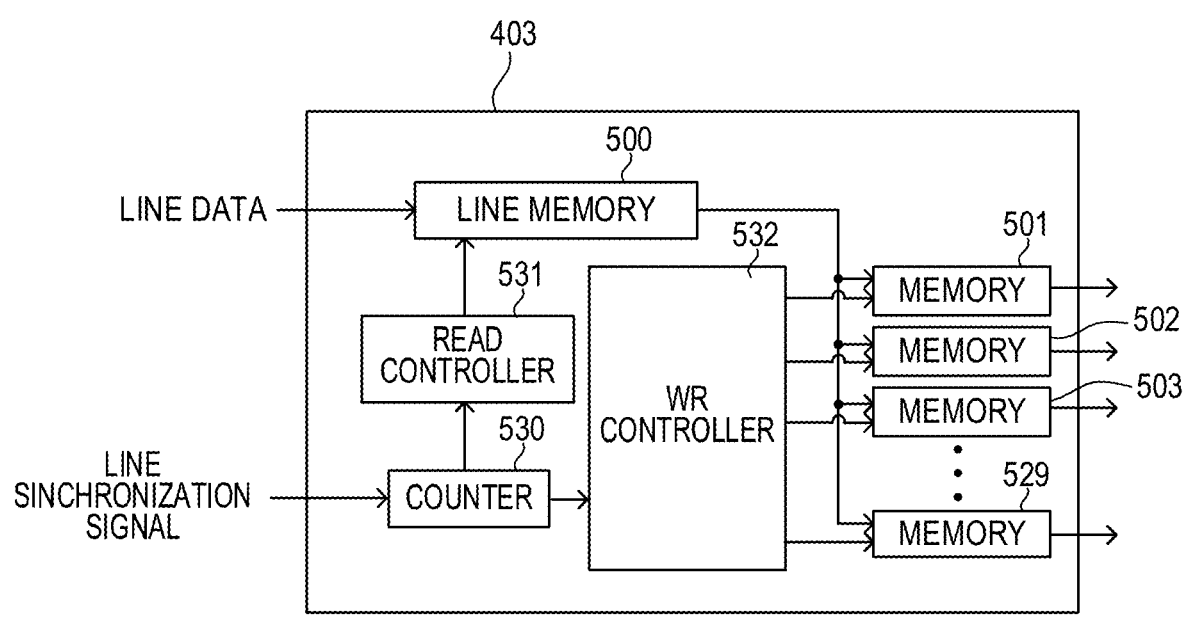
FIG. 5A is a control block diagram of a chip data converting portion according to Embodiments 1 and 2.

FIG. 5A is a block diagram illustrating the configuration of the chip data converting portion 403. In FIG. 5A, a line synchronization signal that is output from the sync signal generating portion 406 is input to a counter 530. The counter 530 includes a frequency modulation circuit that modulates the line synchronization signal that is input and generates a CLK signal of a higher frequency than the line synchronization signal. The counter 530 may have a built-in oscillator that generates a clock signal (CLK) of a higher frequency than the line synchronization signal, instead of a frequency modulation circuit. Hereunder, a configuration in which the chip data converting portion 403 reads out line data from the line data shift portion 402 is described as an example, although an embodiment of the present invention is not limited to this example. That is, by adopting a configuration in which a line synchronization signal is supplied to the line data shift portion 402, and the line data shift portion 402 also generates a clock signal internally, the line data shift portion may be configured to proactively transmit line data to the chip data converting portion 403.

Figure 5B:
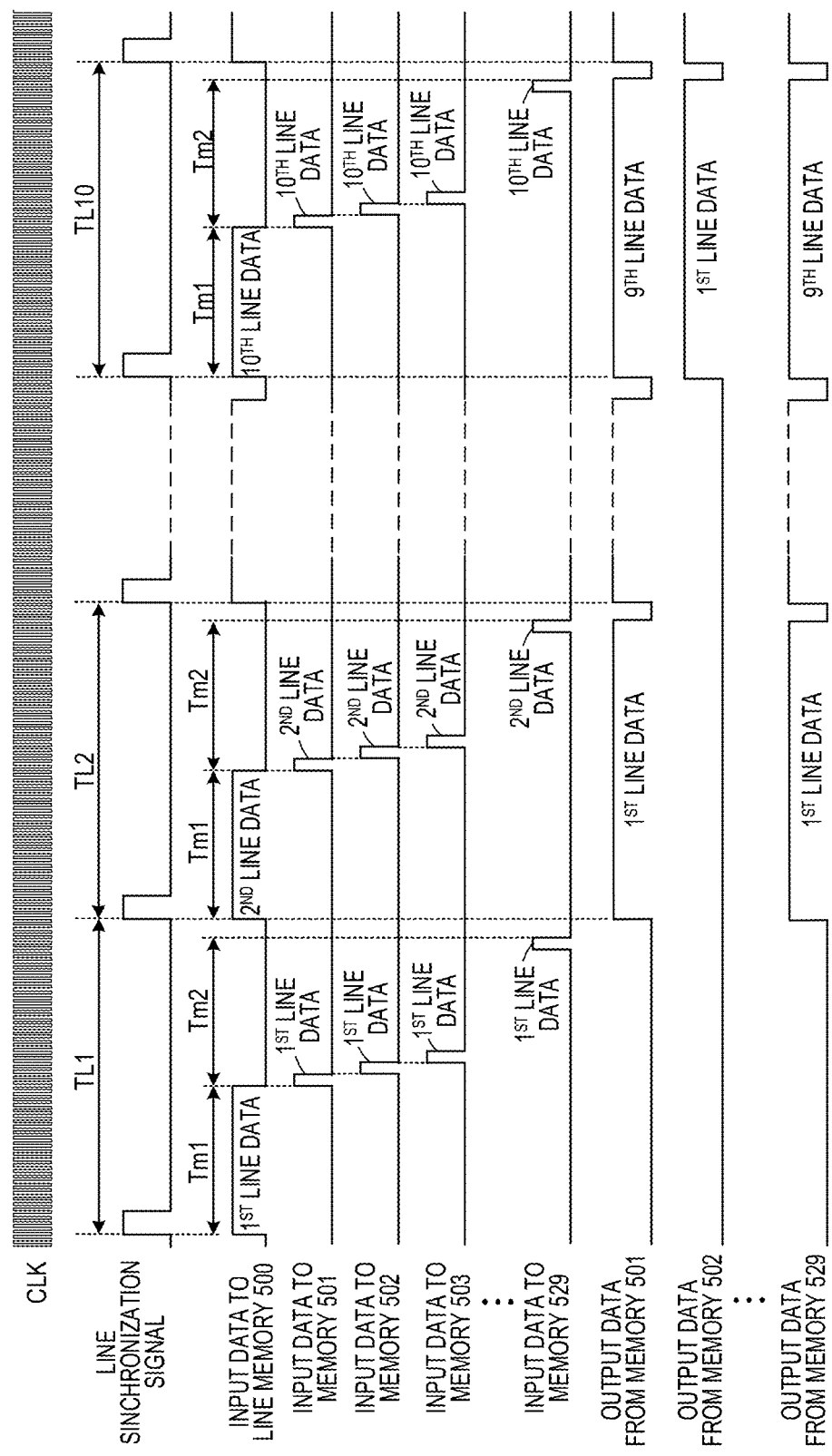
FIG. 5B is a timing chart.

When a line synchronization signal is input to the counter 530, the counter 530 resets the count value to 0, and thereafter increments the count value in synchrony with the number of pulses of the CLK (clock) signal (see FIG. 5B). The frequency of a CLK signal that the counter 530 generates is determined at the design stage based on the volume (number of bits) of pixel data that the chip data converting portion 403 should read out within one period of the line synchronization signal, and the data processing speed of the chip data converting portion 403 that is described later. For example, as described above, the surface-emitting-element-array element group 201 has 14,964 (1200 dpi conversion) light emitting elements that expose one line in the sub-scanning direction. On the other hand, the image data generating portion 401 performs dithering processing at a resolution of 2400 dpi. Therefore, the number of pixels in image data for one line in the sub-scanning direction that is output from the line data shift portion 402 is 29,928 pixels (=14,964×(2400 dpi/1200 dpi)). During the period between the line synchronization signal and the line synchronization signal, the chip data converting portion 403 reads out line data for one line in the sub-scanning direction and writes the line data into a line memory 500 that is described later, and writes image data to memories 501 to 529 that are described later. Therefore, the counter 530 performs an operation that counts a number (59,856) that is twice the number of pixels (29,928) included in the line data for one line. A time period in which the count value of the counter 530 is within the range of 1 to 29,928 is represented by Tm1, and a time period in which the count value of the counter 530 is within the range of 29,929 to 59,856 is represented by Tm2 (see FIG. 5B). A READ controller 531 reads out line data in accordance with the count value of the counter 530 from the line data shift portion 402. That is, in the time period Tm1 in which the count value of the counter 530 is within the range from 1 to 29,928, the READ controller 531 stores line data (29,928 pixels) for one line in the main scanning direction in the line memory 500. Further, in the time period Tm2 in which the count value of the counter 530 is within the range from 29,929 to 59,856, a WR controller 532 divides line data for one line in the sub-scanning direction that is stored in the line memory 500 and writes the line data in the memories 501 to 529. The memories 501 to 529 are memories which have a smaller storage capacity than the line memory 500, and which store line data (divided line data) that was divided for each chip. The memories 501 to 529 are FIFO (First-In-First-Out) memories that are provided in correspondence with the surface emitting element array chips (SEEAC) 1 to 29. That is, the memory 501 stores line data corresponding to the surface emitting element array chip 1, the memory 502 stores line data corresponding to the surface emitting element array chip 2 . . . and the memory 529 stores line data corresponding to the surface emitting element array chip 29.

Next, writing of line data that was read out from the line data shift portion 402 to the memories 501 to 529, and output of image data that was written in the memories 501 to 529 which the chip data converting portion 403 executes will be described. FIG. 5B is a time chart for describing the input and output timings of line data with respect to operations by the chip data converting portion 403. In FIG. 5B, the term "line synchronization signal" denotes a pulse signal that is output from the sync signal generating portion 406. Further, in FIG. 5B, reference characters TL1, TL2 . . . TL10 denote the numbers of periods for one line in the sub-scanning direction. One period of the line synchronization signal is divided into the time period Tm1 and the time period Tm2 in accordance with the count value of the counter 530. The term "input data to line memory 500" denotes image data from the line data shift portion 402, and the data is input from the line data shift portion 402 in the time period Tm1 of the periods TL1, TL2 . . . TL10. The term "$1^{st}$ line data" in FIG. 5B denotes line data (for one line in the main scanning direction) of the first line in the sub-scanning direction. Similarly, the terms "$2^{nd}$ line data" . . . "$10^{th}$ line data" denote line data (for one line in the main scanning direction) of the second line in the sub-scanning direction . . . line data of the tenth line in the sub-scanning direction, respectively.

Further, the term "input data to memory 501" shown in FIG. 5B denotes the timing at which, among the line data that is stored in the line memory 500, line data corresponding to a surface emitting element array chip 1 is written into the memory 501. Similarly, the terms "input data to memory 502", "input data to memory 503" . . . "input data to memory 529" denote the timings at which line data corresponding surface emitting element array chips 2, 3 . . . 29 are written into the memories 502, 503 . . . 529, respectively. Note that, the term "$1^{st}$ line data" of the input data to the memory 501 refers to line data (divided line data) in the main scanning direction corresponding to the surface emitting element array chip 1, and not the entire line data for one line in the main scanning direction. The same applies with respect to the input data to the memory 502 to memory 529.

The term "output data from memory 501" shown in FIG. 5B denotes the timing at which line data that was written into the memory 501 is read out to output the data to the surface emitting element array chip 1. Similarly, the terms "output data from memory 502" . . . "output data from memory 529" shown in FIG. 5B denote the timings at which line data is read out to output the data to the surface emitting element array chip 2 . . . "surface emitting element array chip 29", respectively. Note that, the term "$1^{st}$ line data" of the output data from the memory 501 refers to line data (divided line data) in the main scanning direction corresponding to the surface emitting element array chip 1, and not the entire line data for one line in the main scanning direction. The same applies with respect to the output data from the memory 502 to memory 529.

According to the present embodiment, line data for one line in the main scanning direction is read out sequentially from the line memory 500 and, firstly, is written in the memory 501 that stores line data for the surface emitting element array chip 1. Next, writing into the memory 502 that stores image data for the surface emitting element array chip 2 is performed, and thereafter writing is consecutively performed in sequence up to the memory 529 that stores image data for the surface emitting element array chip 29. Note that, in the chip data shift portion 404 that is at a subsequent stage to the chip data converting portion 403, data shift processing in the sub-scanning direction is performed in surface emitting element array chip units. Therefore, it is assumed that line data for 10 lines in the sub-scanning direction 10 is stored in the memories 501 to 529.

Furthermore, with regard to the line data stored in the memories 501 to 529, in addition to the line data for single chips which corresponds to the respective surface emitting element array chips, pixel data that is obtained by duplicating the pixel data for an end portion of the surface emitting element array chips that are adjacent to the relevant surface emitting element array chip is also stored together therewith. For example, in the memory 502, the following pixel data is stored at the two ends of the line data corresponding to the surface emitting element array chip 2, respectively. That is, pixel data for the endmost portion on the surface emitting element array chip 2 side of the surface emitting element array chip 1 and pixel data for the endmost portion on the surface emitting element array chip 2 side of the surface emitting element array chip 3 are added to the aforementioned line data and stored in the memory 502.

Figure 6A:
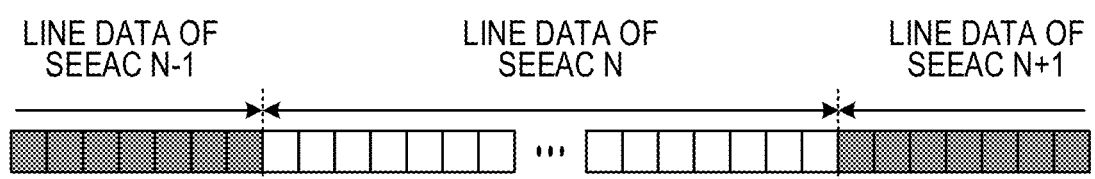
FIG. 6A and FIG. 6B are views for describing processing of image data performed by the chip data converting portion according to Embodiments 1 and 2.
Figure 6B:
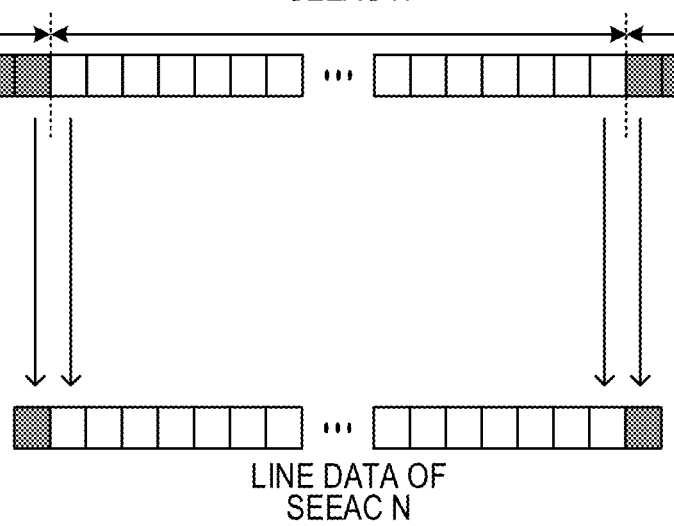

FIG. 6A and FIG. 6B are views for describing the relation between line data stored in the line memory 500 and line data stored in the memories 501 to 529. FIG. 6A is a view illustrating line data for each surface emitting element array chip (SEEAC) that is stored in the line memory 500, and illustrates an image of the arrangement of line data before the arrangement is changed in the memories 501 to 529. Line data of a surface emitting element array chip (N–1) (shown with hatching), line data of a surface emitting element array chip N (shown as white boxes), and line data of a surface emitting element array chip (N+1) (shown with hatching) are stored in the line memory 500.

On the other hand, FIG. 6B illustrates an image of line data in a memory corresponding to the surface emitting element array chip N. As described above, in the memories 502 to 528 corresponding to the surface emitting element array chips, pixel data of end portions of the adjacent surface emitting element array chips is added to and stored with the line data of the relevant surface emitting element array chip. In the line data of the surface emitting element array chip N illustrated in FIG. 6B, the pixel data on the leftmost side is the pixel data of the end portion adjacent to the surface emitting element array chip N that is included in the line data of the surface emitting element array chip (N–1) (see arrow in FIGS. 6A and 6B). On the other hand, in the line data of the surface emitting element array chip N illustrated in FIG. 6B, the pixel data on the rightmost side is the pixel data of the end portion adjacent to the surface emitting element array chip N that is included in the line data of the surface emitting element array chip (N+1) (see arrow in FIGS. 6A and 6B).

Note that, in the memory 501, pixel data of the endmost portion on the surface emitting element array chip 1 side of the surface emitting element array chip 2 is added to the end portion of the line data corresponding to the surface emitting element array chip 1 and stored. Further, in the memory 529, pixel data of the endmost portion on the surface emitting element array chip 29 side of the surface emitting element array chip 28 is added to the end portion of the line data corresponding to the surface emitting element array chip 29 and stored.

Thus, in the present embodiment, the pixel data of end portions of the surface emitting element array chips that are adjacent to the respective surface emitting element array chips is added to the two ends of the line data of the relevant surface emitting element array chip, and the resulting data is stored in the memories 501 to 529. By the above described operations of the chip data converting portion 403, line data for one line in the main scanning direction is stored together with pixel data of end portions of the adjacent surface emitting element array chips in the memories 501 to 529 that are provided in correspondence with the surface emitting element array chips 1 to 29. Note that the pixel data of end portions of the adjacent surface emitting element array chips is used by a filter processing portion 408 that is described later.

(Chip Data Shift Portion)

The chip data shift portion 404 that is a correction unit performs the following control. That is, the chip data shift portion 404 controls the relative readout timing for reading line data from the memories 501 to 529, based on data (2400 dpi units) relating to image shift amounts in the sub-scanning direction for each surface emitting element array chip which have been instructed in advance by the CPU 400. Hereunder, the image shift processing in the sub-scanning direction which the chip data shift portion 404 executes is described specifically.

It is desirable that there is no deviation between the mounting positions of each even-numbered surface emitting element array chip in the longitudinal direction of the exposure head 106. Similarly, it is also desirable that there is no deviation between the mounting positions of each odd-numbered surface emitting element array chip in the longitudinal direction of the exposure head 106. Further, it is preferable in terms of the design that the mounting position relation in the sub-scanning direction between the respective even-numbered surface emitting element array chips and the respective odd-numbered surface emitting element array chips corresponds to a predetermined number of pixels (for example, 8 pixels) corresponding to 2400 dpi. In addition, it is preferable that the arrangement positions in the sub-scanning direction of a row of light emitting elements inside each surface emitting element array chip are uniform and without individual differences. However, the mounting positions of the surface emitting element array chips and the arrangement positions of the rows of light emitting elements include errors, and there is a risk that these errors will lead to a decrease in the image quality of an output image.

In a memory 420 (ROM) illustrated in FIG. 4, correction data is stored that was calculated based on the relative positional relation in the sub-scanning direction of the respective rows of light emitting elements of the surface emitting element array chips 1 to 29 that are mounted in a staggered manner on the drive board 202. For example, correction data that is based on the following measurement data is stored in the memory 420. Correction data is stored that shows whether, with respect to a row of light emitting elements of the surface emitting element array chip 1 that serves as a reference for the position in the sub-scanning direction, the respective rows of light emitting elements of the other surface emitting element array chips 2 to 29 are mounted on the drive board 202 in a manner in which some pixels corresponding to 2400 dpi are out of alignment in the sub-scanning direction. The measurement data is obtained by a measurement apparatus based on results regarding light received in a case where, after the surface emitting element array chips 2 to 29 are mounted on the drive board 202, the light emitting elements of each surface emitting element array chip are lit. In response to the power of the image forming apparatus being turned on, the CPU 400 sets correction data that is read out from the memory 420 in an internal register of the chip data shift portion 404. The chip data shift portion 404 performs shift processing of line data for forming lines that are identical to the lines stored in the memories 501 to 529, based on the correction data that is set in the internal register. For example, in a case where, relative to the row of light emitting elements of the surface emitting element array chip 1, the row of light emitting elements of the surface emitting element array chip 2 is mounted on the drive board in a manner in which 8 pixels are out of alignment in the sub-scanning direction that correspond to 2400 dpi, the chip data shift portion 404 performs the following processing. That is, relative to the output timing for outputting line data corresponding to the surface emitting element array chip 1 to the drive board 202, the chip data shift portion 404 delays the output timing of the line data corresponding to the surface emitting element array chip 2 for forming the same line by an amount that corresponds to 8 pixels. Therefore, the chip data shift portion 404 shifts the entire line data corresponding to the surface emitting element array chip 2 relative to the line data corresponding to the surface emitting element array chip 1.

(Chip Data Transmitting Portion)

After the above described series of data processing operations has been executed on the line data, the chip data transmitting portion 405 transmits the resulting line data to the drive board 202 of the exposure head 106. The timing for transmitting the image data will now be described with reference to the aforementioned FIG. 5B. As illustrated in FIG. 3A, among the surface emitting element array chips, the odd-numbered surface emitting element array chips 1, 3, 5 . . . 29 are disposed on the upstream side in the sub-scanning direction, and the even-numbered surface emitting element array chips 2, 4, 6 . . . 28 are disposed on the downstream side in the sub-scanning direction. In the time chart illustrated in FIG. 5B, writing of image data to the memory 501 . . . memory 529 that correspond to the odd-numbered surface emitting element array chips 1 . . . 29 is performed in the time period (TL1 in FIG. 5B) of the initial line synchronization signal. Further, in the time period (TL2 in FIG. 5B) of the next line synchronization signal, reading of the first line data in the sub-scanning direction from the memory 501 . . . memory 529 that correspond to the odd-numbered surface emitting element array chips 1 . . . 29 is performed. Similarly, in the time period of the next line synchronization signal thereafter, reading of the second line data in the sub-scanning direction from the memory 501 . . . memory 529 that correspond to the odd-numbered surface emitting element array chips 1 . . . 29 is performed. Subsequently, in the time period (TL10 in FIG. 5B) of the 10$^{th}$ line synchronization signal, reading of the ninth line data in the sub-scanning direction from the memory 501 . . . memory 529 that correspond to the odd-numbered surface emitting element array chips 1 . . . 29 is performed. Furthermore, with respect to the memory 502 that corresponds to the even-numbered surface emitting element array chip 2, writing of image data to the memory 502 is performed from the time period TL1, and reading of image data from the memory 502 is performed in a time period (TL10 in FIG. 5B) after nine pulses of the line synchronization signal.

The chip data transmitting portion 405 transmits line data that was processed by the chip data shift portion 404 to the drive board 202. Instead of an oscillator, the chip data transmitting portion 405 includes a frequency modulation circuit that modulates the line synchronization signal that is input and generates a clock signal of a higher frequency than the line synchronization signal. The chip data transmitting portion 405 may contain an oscillator that generates a clock signal of a higher frequency than the line synchronization signal, instead of the frequency modulation circuit. In the present embodiment the frequency of the clock signal (CLK in FIG. 5B) is set so that a count value within one period of the line synchronization signal becomes equal to or higher than 59,856 (a number that is twice the number of pieces of pixel data in one line). Thereby, input (writing) of image data to the line memory 500, and output (writing) of image data from the line memory 500 to the memories 501 to 529 can be performed within one period of the line synchronization signal.

On the other hand, with regard to reading of data from the memories 501 to 529, image data for one line in the main scanning direction that corresponds to the respective surface emitting element array chips is output in parallel from the 29 memories 501 to 529 within the time period of one period of the line synchronization signal. Therefore, with regard to the speed at which image data is read out from the memories 501 to 529, the readout speed may be lower than the speed of writing to the memory. For example, in the present embodiment, it is assumed that image data from the memories 501 to 529 is read out in a long period that is 58 times longer than the period of the clock signal when writing image data to the memories 501 to 529.

[Configuration of Drive Board of Exposure Head]

(Data Receiving Portion)

Next, internal processing of the driving portion 303*a* that is mounted on the drive board 202 of the exposure head 106 will be described. The driving portion 303*a* includes functional blocks for a data receiving portion 407, the filter processing portion 408, an LUT 410, a PWM signal generating portion 411, a timing controller 412, a control signal generating portion 413 and a drive voltage generating portion 414. Hereunder, the processing of each functional block will be described in the order in which image data is processed in the driving portion 303*a*. Note that, as mentioned above, in the chip data converting portion 403, arrangement of image data is performed for each of the 29 surface emitting element array chips, and the processing blocks described hereinafter are configured to perform parallel processing of the respective pieces of image data stored in the 29 chips. It is assumed that the driving portion 303*a* has circuits that receive image data corresponding to the surface emitting element array chips 1 to 15, and are capable of performing parallel processing for each surface emitting element array chip.

(Data Receiving Portion)

The data receiving portion 407 receives signals that are transmitted from the chip data transmitting portion 405 of the control board 415. Here, it is assumed that the data receiving portion 407 and the chip data transmitting portion 405 are synchronized with the line synchronization signal, and receive and transmit image data (line data) in line units for the sub-scanning direction.

(Filter Processing Portion)

Figure 7:
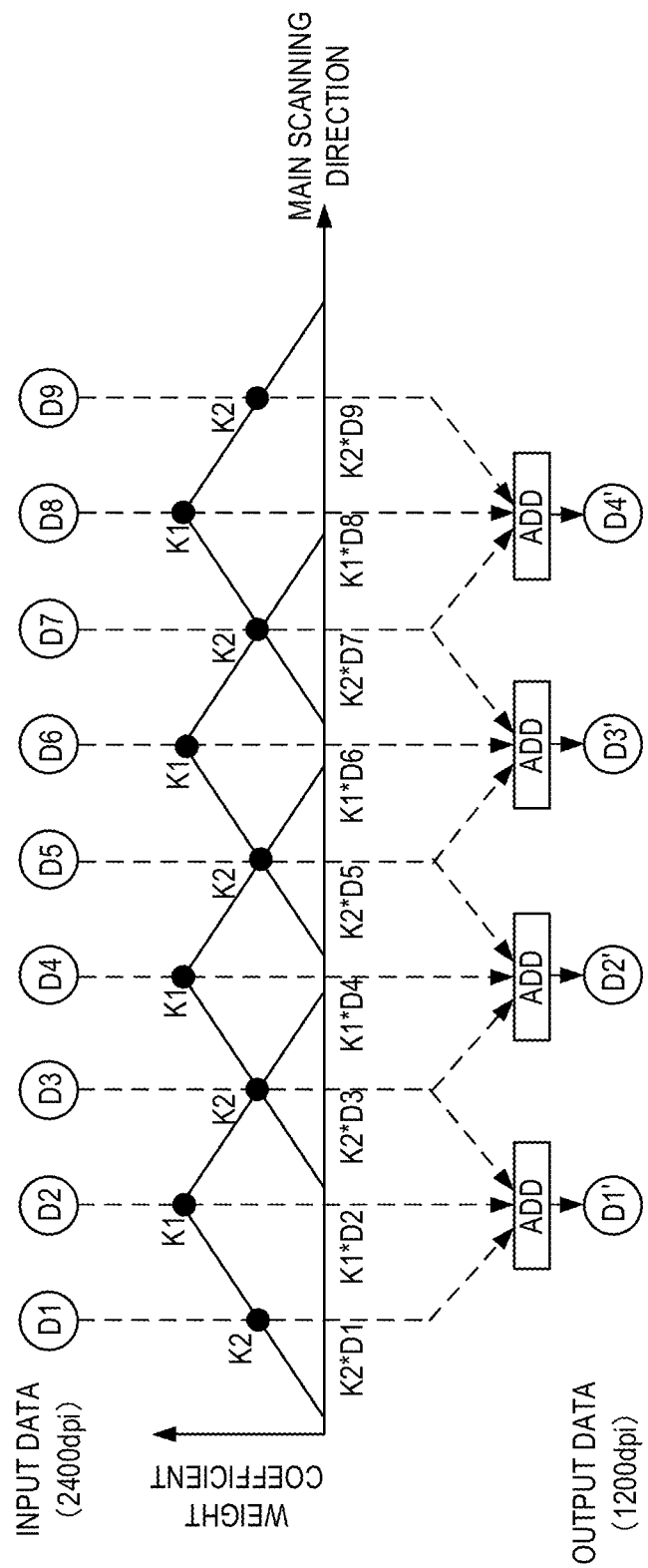
FIG. 7 is a view for describing filter processing according to Embodiment 1.

The filter processing portion 408 that is a conversion unit performs interpolation processing by filter processing in the main scanning direction on the image data for each surface emitting element array chip to thereby convert the resolution in the main scanning direction from 2400 dpi to 1200 dpi. FIG. 7 is a view for describing the manner of filter processing that is performed in the filter processing portion 408. In FIG. 7, reference characters D1 to D9 denote image data (input data at a resolution of 2400 dpi) of a surface emitting element array chip. In this case, the image data D1 to D8 is image data of the relevant surface emitting element array chip, and the image data D9 is pixel data of the endmost portions of adjacent surface emitting element array chips as described above. Reference characters D1' to D4' denote image data (output data at a resolution of 1200 dpi) after the filter processing of the filter processing portion 408 is performed. The resolution (1200 dpi) of the output data is half the resolution (2400 dpi) of the input data, and the formula for calculating the image data of each pixel is represented by the following Formula (1).

$$Dn' = D(2 \times n-1) \times K2 + D(2 \times n) \times K1 + D(2 \times n+1) \times K2 \quad \text{(Formula 1)}$$

Here, n corresponds to the number of the 516 light emitting elements in each surface emitting element array chip, and computation of the image data for each light emitting element is performed sequentially in the order of n=1 to 516, based on the lighting sequence of the light emitting elements. Further, K1 that is a first coefficient is a weight coefficient with respect to input data at the same coordinate position in the main scanning direction as output data. Furthermore, K2 that is a second coefficient is a weight coefficient with respect to input data at coordinates which deviate by an amount corresponding to half of a pixel in the main scanning direction relative to output data. Although in the present embodiment an interpolation operation (filter processing) is performed using the values K1=0.5 and K2=0.25, weight coefficients that differ from the present embodiment may also be used. In the present embodiment, by making the weight coefficient K2 a value that is greater than 0, information of image data generated at a resolution (2400 dpi) that is higher than the resolution (1200 dpi) of the output data can be reflected in the output data. Specifically, the processing from the processing performed at the image data generating portion 401 of the control board 415 until the processing at the data receiving portion 407 of the exposure head 106 that shifts the image position in the main scanning direction is performed at 2400 dpi, and the resolution of the image data is then converted to 1200 dpi by the filter processing portion 408 at the subsequent stage. Thereby, generation of an image with a resolution of 1200 dpi in a state in which the image shifting accuracy in units of 2400 dpi was maintained is enabled.

Figure 8A:
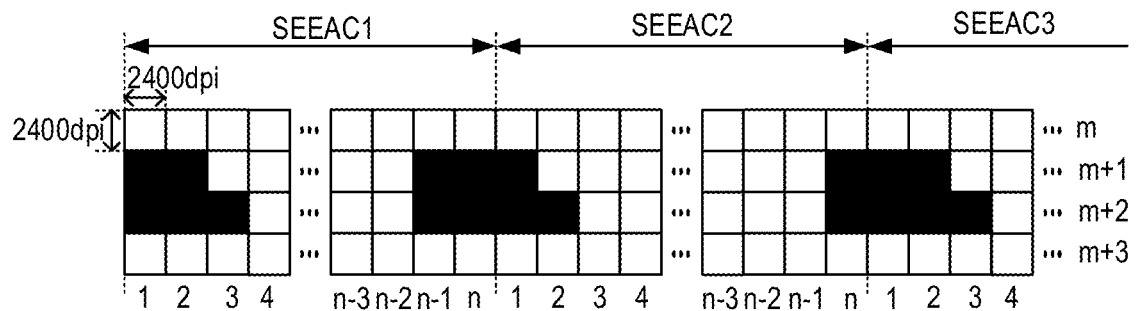
FIG. 8A, FIG. 8B and FIG. 8C are views for describing filter processing according to Embodiment 1.
Figure 8B:
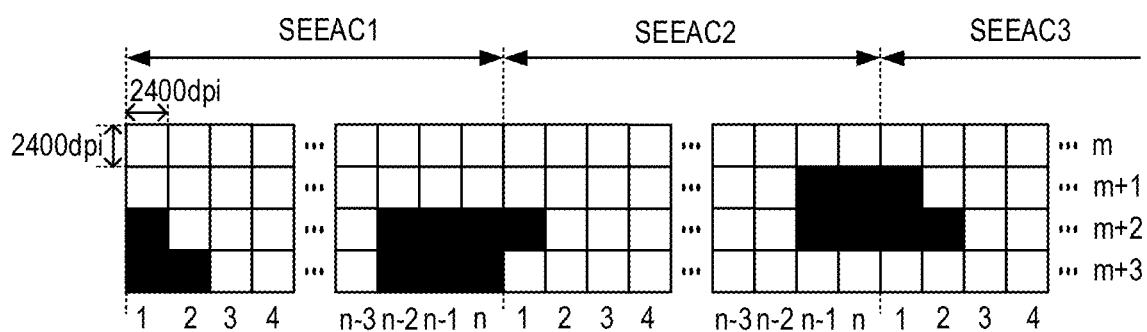
Figure 8C:
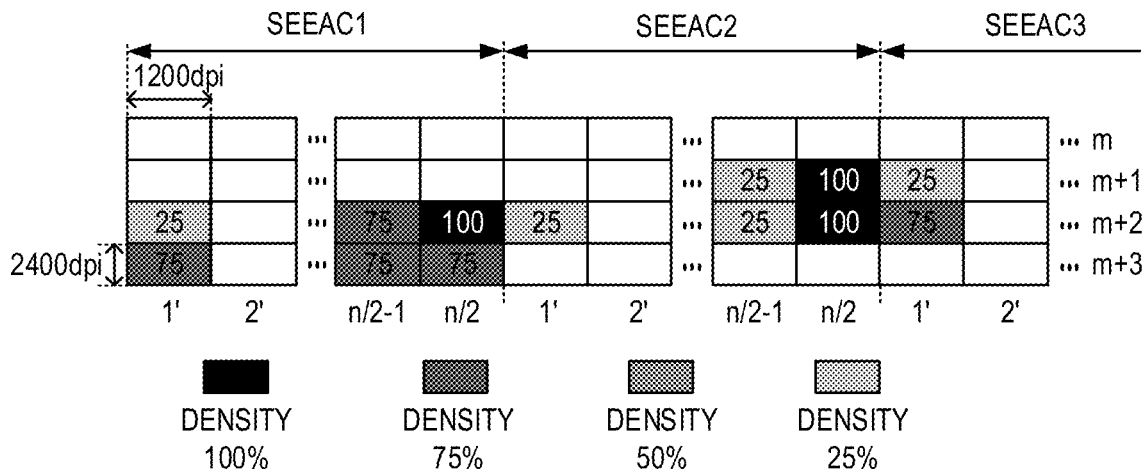

FIG. 8A, FIG. 8B and FIG. 8C are views for describing shifting of image data before and after filter processing, and changes in image data caused by filter processing. FIG. 8A is a view illustrating image data having a resolution of 2400 dpi after performing dithering processing of the surface emitting element array chips (SEEAC) 1, 2 and 3 in the image data generating portion 401 of the control board 415. In FIG. 8A, the image data is illustrated in the two tones of black and white. The vertical axis in FIG. 8A represents the sub-scanning direction, and reference characters m to m+3 denote lines in the sub-scanning direction. The horizontal axis in FIG. 8A represents the main scanning direction, and reference numerals 1, 2 . . . n−1 and n denote the arrangement order for a resolution of 2400 dpi of the light emitting elements in the surface emitting element array chip. FIG. 8B is a view illustrating image data after the image data illustrated in FIG. 8A is shifted in 2400 dpi units by the line data shift portion 402 and the chip data shift portion 404 of the control board 415. To simplify the description, FIG. 8B illustrates an example of shifting an image by shifting the image data illustrated in FIG. 8A by the amount of one pixel in the left direction in the main scanning direction, and shifting image data corresponding to the surface emitting element array chip 1 by the amount of one pixel in the downward direction in the sub-scanning direction in array chip units.

FIG. 8C illustrates image data that, with respect to the image that was shifted in the main scanning direction and the sub-scanning direction in FIG. 8B, is obtained after the resolution of the image data for the main scanning direction is converted from 2400 dpi to 1200 dpi by the filter processing portion 408 of the driving portion 303*a* of the drive board 202. Note that, reference characters 1', 2' . . . n/2−1, and n in the horizontal axis direction denote the arrangement order of the light emitting elements of the surface emitting element array chip after the resolution is converted to 1200 dpi. The size in the main scanning direction of each pixel (1200 dpi) after the resolution conversion illustrated in FIG. 8C is twice the size of one pixel (2400 dpi) that is illustrated in FIG. 8B. In addition, with respect to the position of each pixel, although the position is shifted to the right side by the amount of half a pixel in FIG. 8B (a position that is advanced by half of a pixel in the main scanning direction), the centroid position of the image does not change between before and after the resolution conversion. For example, the size and the position of a pixel 1' of the surface emitting element array chip 1 after resolution conversion in FIG. 8C are a size and a position obtained by adding together half of a pixel at a pixel position 1, a pixel at a pixel position 2 and half of a pixel at a pixel position 3 of the surface emitting element array chip 1 before resolution conversion in FIG. 8B. Similarly, the size and the position of a pixel 2' of the surface emitting element array chip 1 after resolution conversion in FIG. 8C are a size and a position obtained by adding together half of a pixel at a pixel position 3, a pixel at a pixel position 4 and half of a pixel at a pixel position 5 of the surface emitting element array chip 1 before resolution conversion in FIG. 8B.

Further, the size and the position of a pixel (n/2−1) of the surface emitting element array chip 1 after resolution conversion in FIG. 8C are as follows. That is, the size and the position are obtained by adding together half of a pixel at a pixel position (n−3), a pixel at a pixel position (n−2) and half of a pixel at a pixel position (n−1) of the surface emitting element array chip 1 before resolution conversion in FIG. 8B. Similarly, the size and the position of a pixel (n/2) of the surface emitting element array chip 1 after resolution conversion in FIG. 8C are as follows. That is, the size and the position are obtained by adding together half of a pixel at a pixel position (n−1) and a pixel at a pixel position (n) of the surface emitting element array chip 1 before resolution conversion in FIG. 8B and also a half of a pixel at a pixel position 1 of the adjacent surface emitting element array chip 2. Note that, the numbers in the respective pixels in FIG. 8C show the density values of the respective pixels. In the present embodiment it is assumed that the pixel data is processed using 8 bits for the number of gradations after resolution conversion. In FIG. 8C, in a case where the density value of a black portion is taken as 100% and the density value of a white portion (including a frame portion that is not displayed in FIG. 8C) is taken as 0%, when the density value of each pixel is calculated by the aforementioned Formula (1), the density values are expressed by five values which are 0%, 25%, 50%, 75% and 100%. By processing the number of gradations of one pixel after resolution conversion using 3 bits or more, smooth processing in which a stepped difference in density levels does not arise is enabled.

For example, the density value of pixel 1' of the surface emitting element array chip 1 in the (m+3) row in FIG. 8C is calculated as follows using Formula (1) and the densities of pixels in FIG. 8B. That is, the density value of pixel 1'=density (1) of pixel 1×K2 (0.25)+density (1) of pixel 2×K1 (0.5)+density (0) of pixel 3×K2 (0.25)=0.75 (75%). Similarly, the density value of pixel 2' of the surface emitting element array chip 1 in the (m+3) row in FIG. 8C is calculated as follows using Formula (1) and the densities of pixels in FIG. 8B. That is, the density value of pixel 2'=density (0) of pixel 3×K2 (0.25)+density (0) of pixel 4×K1 (0.5)+density (0) of pixel 5×K2 (0.25)=0 (0%). Further, the density value of pixel (n/2) of the surface emitting element array chip 1 in the (m+3) row in FIG. 8C is calculated as follows using Formula (1) and the densities of pixels in FIG. 8B. That is, the density value of pixel (n/2)=density (1) of pixel (n−1)×K1 (0.25)+density (1) of pixel (n)×K1 (0.5)+density (0) of pixel 1 of the surface emitting element array chip 2×K2 (0.25)=0.75 (75%).

Further, when performing filter processing, in the case of performing processing of a pixel at an end portion of a surface emitting element array chip, if there is no pixel data for the adjacent surface emitting element array chip, some of the image will be missing and an image defect will be produced. Therefore, as described above, in the chip data converting portion 403 of the control board 415, by adding the pixel data on an end portion side of the adjacent surface emitting element array chips and arranging the image data, filter processing in which there is no image loss can be performed.

(LUT)

Next, the LUT 410 refers to image data values (density data values) for each pixel corresponding to a light emitting element in the surface emitting element array chip in a look-up table and performs data conversion. In the LUT 410, conversion of the data value for each pixel is performed so that an integrated light amount when the pixels are caused to emit a pulsed light becomes a predetermined value, based on response characteristics with respect to the light emission time of the surface emitting element array chip. For example, in a case where the response of the light emission time of the surface emitting element array chip is slow and the integrated light amount is less than a target value, data conversion is performed so that the data value increases. In the present embodiment it is assumed that, prior to starting image formation, the CPU 400 sets the values in a conversion table to be set in a look-up table to predetermined values based on response characteristics of a light emitting element array obtained through experimentation.

FIG. 9A, FIG. 9B and FIG. 9C are views that each illustrate a table that shows an example of a look-up table. The LUT 410 uses any of the conversion tables in FIG. 9A to FIG. 9C to convert pixel data corresponding to a resolution of 1200 dpi to a PWM signal. The look-up tables illustrated in FIG. 9A, FIG. 9B and FIG. 9C are conversion tables which associate density values (five values, namely 0%, 25%, 50%, 75%, and 100%) of pixels that are pixel data corresponding to 1200 dpi which were converted by the filter processing portion 408 with 8-bit PWM data to thereby convert the density values to 8-bit PWM data. The binary numerals "000", "001", "010", "011" and "100" in the column on the left side of the conversion tables illustrated in FIG. 9A to FIG. 9C are pixel data corresponding to 1200 dpi that correspond to the density values 0%, 25%, 50%, 75% and 100% of the pixels, respectively. Further, the PWM data in the conversion tables illustrated in FIG. 9A to FIG. 9C represent 8-bit data corresponding to the density values of the pixels. The value "1" in the PWM data represents data for a time when the LED is "on" (light emission data), and the value "0" represents data for a time when the LED is "off" (non-light emission data). The PWM data corresponds to ΦW1 to ΦW4 which are described later. For example, the PWM data corresponding to "000" which corresponds to a pixel density value of 0% is "00000000" in each of the conversion tables in FIG. 9A to FIG. 9C. Further, the PWM data corresponding to "100" which corresponds to a pixel density value of 100% is "11111111" in each of the conversion tables in FIG. 9A to FIG. 9C. On the other hand, the respective items of PWM data that correspond to "001", "010" and "011" which correspond to pixel density values of 25%, 50% and 75%, respectively, are each data of 8 bits which differ from each other in FIG. 9A to FIG. 9C. For example, the PWM data that corresponds to "010" that indicates a pixel density value of 50% is "00001111" in FIG. 9A, is "11110000" in FIG. 9B and is "00111100" in FIG. 9C.

(PWM Signal Generating Portion, Timing Controller, Control Signal Generating Portion, and Drive Voltage Generating Portion)

Next, in a PWM signal generating portion 411, in accordance with the data value for each pixel, a pulse width signal (hereunder, referred to as "PWM signal") is generated that corresponds to a light emission time period in which the surface emitting element array chip emits light within one pixel interval. The timing for outputting the PWM signal is controlled by the timing controller 412. The timing controller 412 generates a synchronization signal corresponding to a pixel interval of each pixel by means of the line synchronization signal generated in the sync signal generating portion 406 of the control board 415, and outputs the synchronization signal to the PWM signal generating portion 411. The drive voltage generating portion 414 generates a drive voltage that drives the surface emitting element array chip in synchronization with the PWM signal. Note that, it is assumed that the drive voltage generating portion 414 has a configuration that is capable of adjusting the voltage level of an output signal to be centered on 5 V so as to obtain a predetermined light amount by means of the CPU 400. In the present embodiment, each surface emitting element array chip is configured to be capable of driving four light emitting elements independently at the same time. The drive voltage generating portion 414 supplies a driving signal to four lines for each surface emitting element array chip, and thus in the exposure head 106 overall the drive voltage generating portion 414 supplies a driving signal to 60 lines=4×one line (15 chips) in a staggered configuration. The driving signals that are supplied to the respective surface emitting element array chips are represented by reference characters ΦW1 to ΦW4 (see FIG. 10). On the other hand, surface emitting element array chips are driven sequentially by the operations of a shift thyristor (see FIG. 10) that is described later. The control signal generating portion 413 generates control signals Φs, Φ1, and Φ2 (see FIG. 10) for transferring to a shift thyristor for each pixel by means of the synchronization signal corresponding to pixel intervals that is generated by the timing controller 412.

[Description of SLED Circuit]

Figure 10:
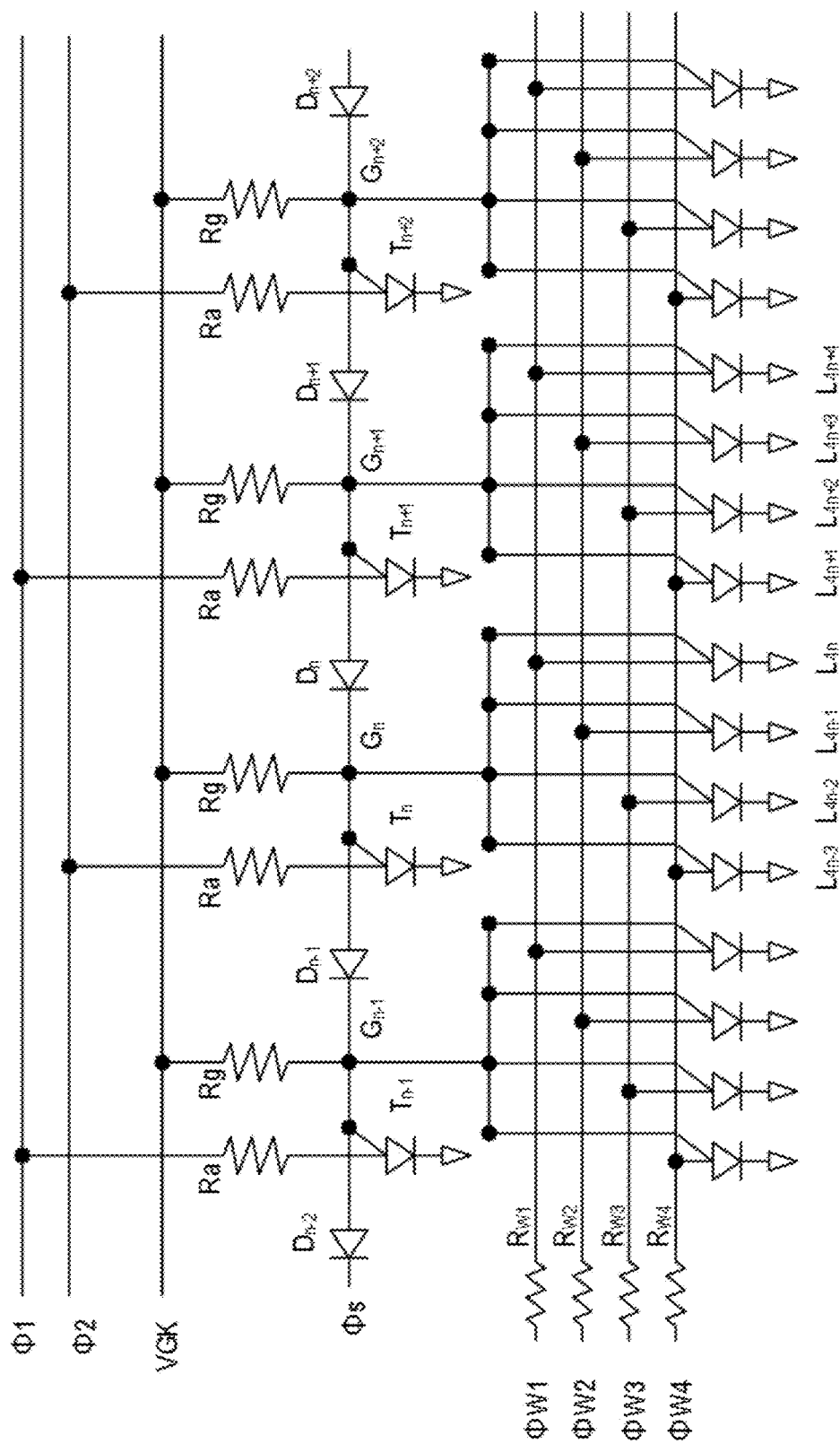
FIG. 10 is a view for describing a circuit of a surface emitting element array chip according to Embodiments 1 and 2.

FIG. 10 is a view illustrating an equivalent circuit obtained by extracting one portion of a self-scanning light emitting element (SLED) chip array of the present embodiment. In FIG. 10, reference characters Ra and Rg denote an anode resistance and a gate resistance, respectively, Tn denotes a shift thyristor, Dn denotes a transfer diode and Ln denotes a light-emitting thyristor. Further, reference characters Gn denotes a common gate of a corresponding shift thyristor Tn and a light-emitting thyristor Ln which is connected to the shift thyristor Tn. Here, n is taken as being an integer of 2 or more. Further, reference characters Φ1 denotes a transfer line of an odd-numbered shift thyristor T, and Φ2 denotes a transfer line of an even-numbered shift thyristor T. Furthermore, reference characters ΦW1 to ΦW4 denote lighting signal lines of the light-emitting thyristors L, and the lighting signal lines ΦW1 to ΦW4 are connected to resistances RW1 to RW4, respectively. Reference characters VGK denote a gain line, and reference characters Φs denote a start pulse line. As illustrated in FIG. 10, a configuration is adopted in which four light-emitting thyristors from L4n−3 to L4n are connected to a single shift thyristor Tn, and the four light-emitting thyristors L4n−3 to L4n can light simultaneously.

[Operations of SLED Circuit]

Next, operations of the SLED circuit illustrated in FIG. 10 will be described. Note that, in the circuit diagram in FIG. 10, it is assumed that a voltage of 5 V is applied to the gain line VGK, and that a voltage that is input to the transfer lines Φ1 and Φ2 and the lighting signal lines ΦW1 to ΦW4 is similarly 5 V. In FIG. 10, when the shift thyristor Tn is in an "on" state, the potential of a common gate Gn of the shift thyristor Tn and the light-emitting thyristor Ln which is connected to the shift thyristor Tn is lowered to approximately 0.2 V. Because a coupling diode Dn is connected between the common gate Gn of the light-emitting thyristor Ln and a common gate Gn+1 of a light-emitting thyristor Ln+1, an approximately equal potential difference arises in the diffusion potential of the coupling diode Dn. In the present embodiment, the diffusion potential of the coupling diode Dn is approximately 1.5 V, and hence the potential of the common gate Gn+1 of the light-emitting thyristor Ln+1 becomes 1.7 V (=0.2 V+1.5 V) which is obtained by adding the 1.5 V of the diffusion potential to the 0.2 V of the potential of the common gate Gn of the light-emitting thyristor Ln. Thereafter, similarly, the potential of a common gate Gn+2 of a light-emitting thyristor Ln+2 becomes 3.2 V (=1.7 V+1.5 V), and the potential of a common gate Gn+3 (not illustrated) of a light-emitting thyristor Ln+3 (not illustrated) becomes 4.7 V (=3.2 V+1.5 V). However, the potential of a common gate Gn+4 of a light-emitting thyristor Ln+4 and of common gates of subsequent light-emitting thyristors is 5 V, since the voltage of the gain line VGK is 5 V and the voltage does not become higher than that. Further, with regard to the potential of a common gate Gn−1 located before (on the left side relative to the common gate Gn in FIG. 10) the common gate Gn of the light-emitting thyristor Ln, because a coupling diode Dn−1 is in a reverse bias state, the voltage of the gain line VGK is applied as it is, and therefore the potential is 5 V.

Figure 11A:
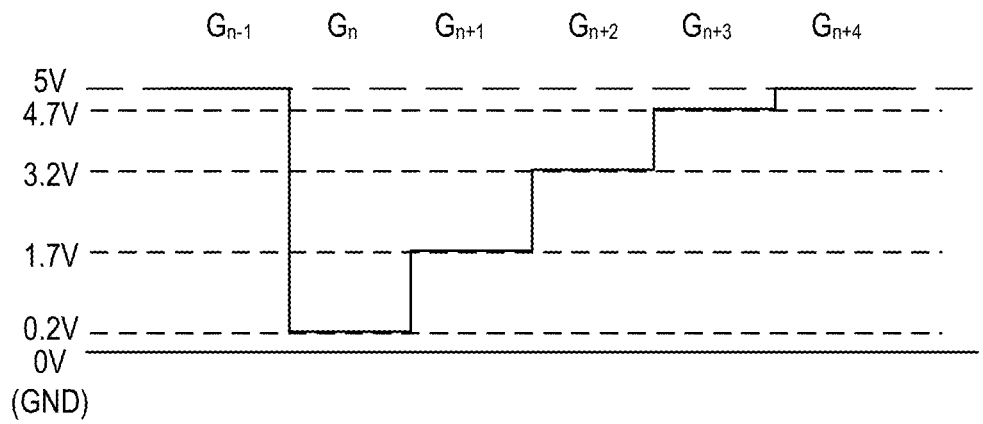
FIG. 11A, FIG. 11B and FIG. 11C are views for describing the distribution state of a gate potential of a shift thyristor according to Embodiments 1 and 2.

FIG. 11A is a view illustrating the distribution of the gate potential of the common gate Gn of each light-emitting thyristor Ln when the aforementioned shift thyristors Tn are in an "on" state, in which common gates Gn−1, Gn, Gn+1 . . . represent the common gates of the light-emitting thyristors L in FIG. 10. A voltage that is required in order for each shift thyristor Tn to turn "on" (hereunder, described as "threshold voltage") is approximately the same potential as a potential obtained by adding the diffusion potential (1.5V) to the gate potential of the common gate Gn of the respective light-emitting thyristors Ln. When the shift thyristor Tn is in an "on" state, among the shift thyristors connected to the line of the transfer line Φ2 of the same shift thyristor Tn, the shift thyristor for which the gate potential of the common gate is lowest is a shift thyristor Tn+2. The potential of the common gate Gn+2 of the light-emitting thyristor Ln+2 that is connected to the shift thyristor Tn+2 is, as described above, 3.2V (=1.7 V+1.5 V) (FIG. 11A). Accordingly, the threshold voltage of the shift thyristor Tn+2 is 4.7 V (=3.2 V+1.5 V). However, because the shift thyristor Tn is "on", the potential of the transfer line Φ2 is lowered by approximately 1.5 V (diffusion potential) and is lower than the threshold voltage of the shift thyristor Tn+2, and consequently the shift thyristor Tn+2 cannot turn on. Other shift thyristors that are connected to the same transfer line Φ2 similarly cannot turn on because the threshold voltage is higher than the shift thyristor Tn+2, and only the shift thyristor Tn can maintain an "on" state.

Figure 11B:
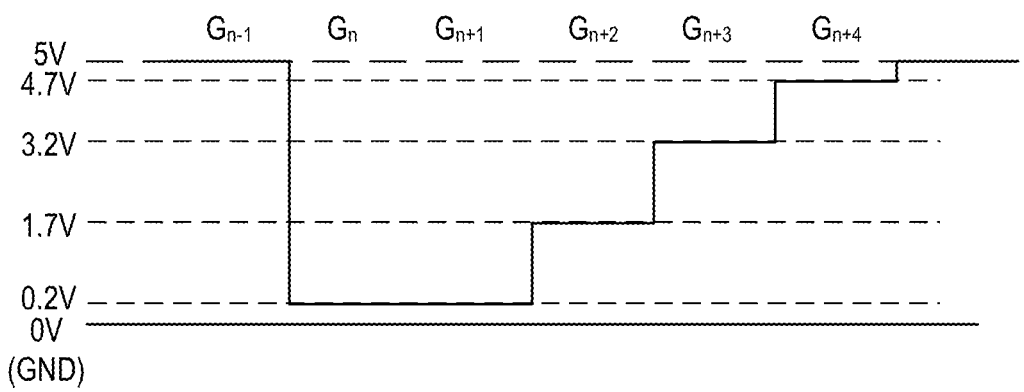
Figure 11C:
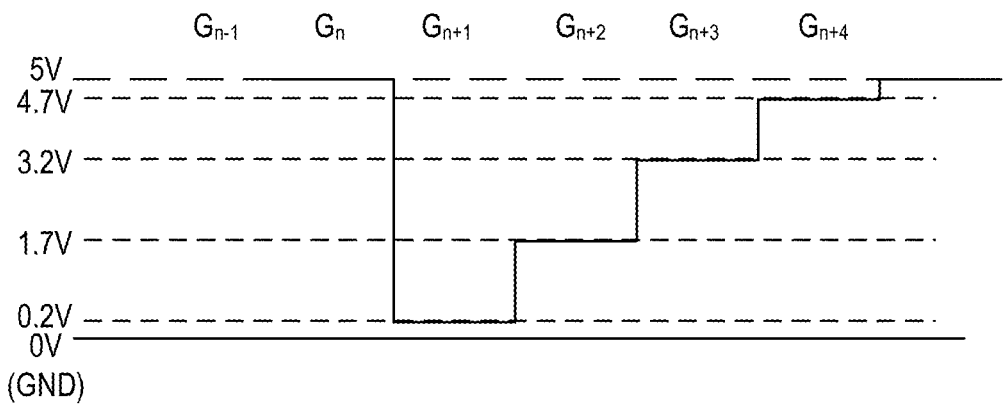

Further, with regard to the shift thyristors connected to the transfer line Φ1, the threshold voltage of the shift thyristor Tn+1 for which the threshold voltage is in the lowest state is 3.2 V (=1.7 V+1.5 V). The threshold voltage of a shift thyristor Tn+3 (not illustrated in FIG. 10) for which the threshold voltage is the next lowest is 6.2 V (=4.7 V+1.5 V). In this state, when 5 V is input to the transfer line Φ1, only the shift thyristor Tn+1 can transition to an "on" state. In this state, the shift thyristor Tn and the shift thyristor Tn+1 are simultaneously in an "on" state. Therefore, the gate potentials of shift thyristors Tn+2, Tn+3 and the like that are provided on the right side in the circuit diagram in FIG. 10 from the shift thyristor Tn+1 are each lowered by the amount of the diffusion potential (1.5 V). However, because the voltage of the gain line VGK is 5 V, and the voltages of the common gates of the light-emitting thyristors L are limited by the voltage of the gain line VGK, the respective gate potentials on the right side from a shift thyristor Tn+5 are 5 V. FIG. 11B is a view illustrating the gate voltage distribution of each of the common gates Gn−1 to Gn+4 at this time, in which the vertical axis represents the gate potential. In this state, if the potential of the transfer line Φ2 is lowered to 0 V, the shift thyristor Tn turns off, and the potential of the common gate Gn of the shift thyristor Tn rises to the VGK potential. FIG. 11C is a view illustrating the gate voltage distribution at this time, in which the vertical axis represents the gate potential. Thus, transferring of the "on" state from the shift thyristor Tn to the shift thyristor Tn+1 is completed.

[Light Emission Operations of Light-Emitting Thyristor]

Next, the light emission operations of the light-emitting thyristors will be described. When only the shift thyristor Tn is "on", the gates of the four light-emitting thyristors L4n−3 to L4n are commonly connected to the common gate Gn of the shift thyristor Tn. Therefore, the gate potential of each of the light-emitting thyristors L4n−3 to L4n is 0.2 V, which is the same as the common gate Gn. Accordingly, the threshold value of the respective light-emitting thyristors is 1.7 V (=0.2 V+1.5 V), and the light-emitting thyristors L4n−3 to L4n are capable of lighting if a voltage of 1.7 V or more is input from the lighting signal lines ΦW1 to ΦW4 of the light-emitting thyristors. Therefore, when the shift thyristor Tn is in an "on" state, four light-emitting thyristors from the light-emitting thyristor L4n−3 to the light-emitting thyristor L4n can be selectively caused to emit light by inputting a lighting signal to the lighting signal lines ΦW1 to ΦW4. At such time, the potential of the common gate Gn+1 of the shift thyristor Tn+1 that is nest to the shift thyristor Tn is 1.7 V, and the threshold voltage of the light-emitting thyristors L4n+1 to 4n+4 that are gate-connected to the common gate Gn+1 is 3.2 V (=1.7 V+1.5 V). Since the lighting signal that is input from the lighting signal lines ΦW1 to ΦW4 is 5 V, it would seem that the light-emitting thyristors L4n+1 to L4n+4 will also light according to the same lighting pattern as the lighting pattern of the light-emitting thyristors L4n−3 to 4n. However, because the threshold voltage is lower from the light-emitting thyristor L4n−3 to the light-emitting thyristor L4n, the light-emitting thyristors L4n+1 to L4n+4 turn on earlier when a lighting signal is input from the lighting signal lines ΦW1 to ΦW4. Once the light-emitting thyristors L4n−3 to L4n turn on, the potential of the lighting signal in the lighting signal lines ΦW1 to ΦW4 connected to the light-emitting thyristors L4n−3 to L4n is lowered to approximately 1.5 V (diffusion potential). Therefore, since the potential in the lighting signal lines ΦW1 to ΦW4 is lower than the threshold voltage of the light-emitting thyristors L4n+1 to L4n+4, the light-emitting thyristor L4n+1 to L4n+4 cannot turn on. Thus, a plurality of light-emitting thyristors L can be caused to light simultaneously by connecting a plurality of light-emitting thyristors L to a single shift thyristor T.

Figure 12:
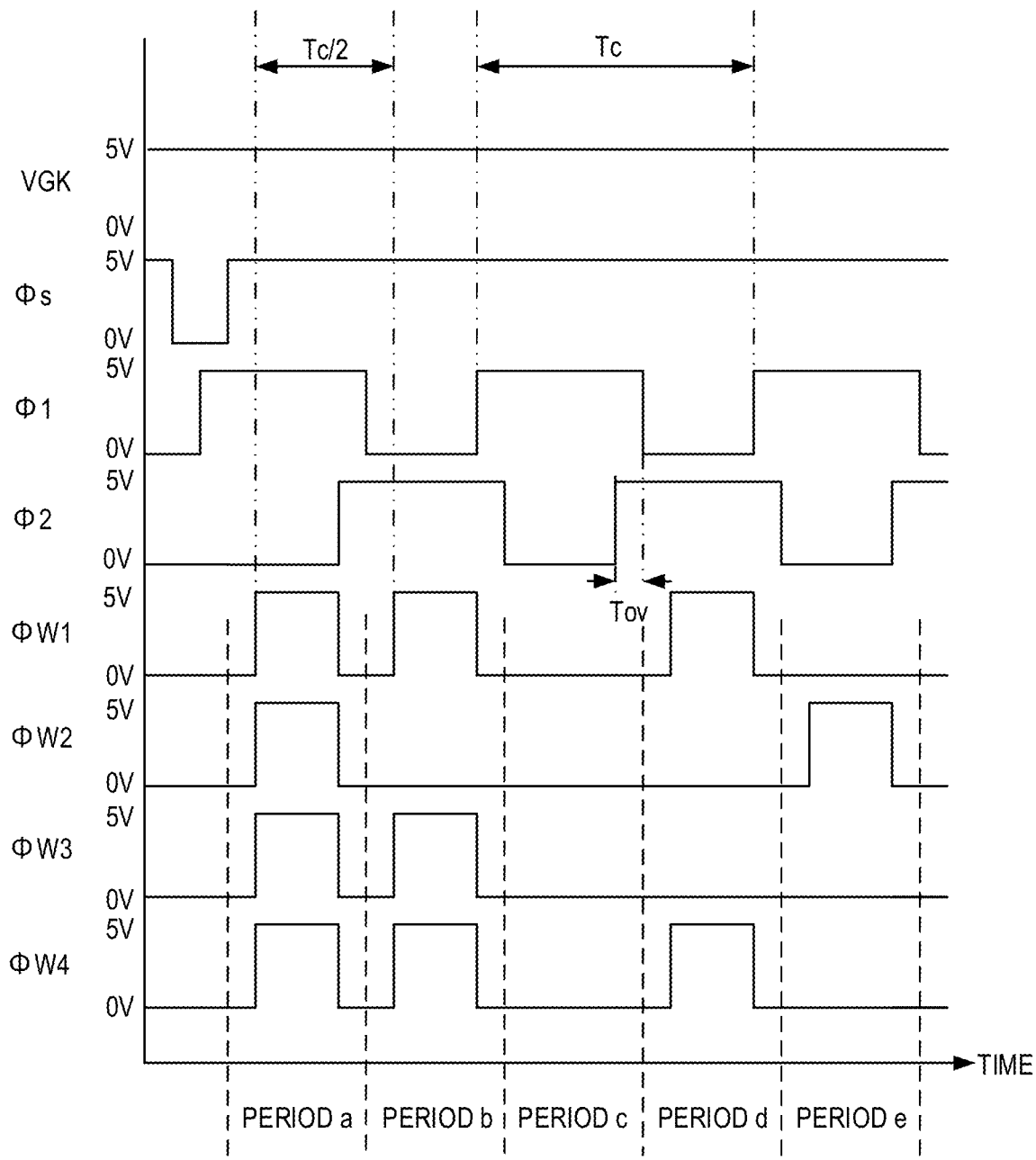
FIG. 12 is a view illustrating waveforms of driving signals of a surface emitting element array chip according to Embodiments 1 and 2.

FIG. 12 is a timing chart of driving signals in the SLED circuit illustrated in FIG. 10. In FIG. 12, voltage waveforms of driving signals of, in order from the top, the gain line VGK, the start pulse line Φs, the transfer lines Φ1 and Φ2 for odd-numbered and even-numbered shift thyristors, and the lighting signal lines ΦW1 to ΦW4 of the light-emitting thyristors are represented. Note that, for the respective driving signals, the voltage is 5 V when the signal is "on", and the voltage is 0 V when the signal is "off". The horizontal axis in FIG. 12 represents time. Further, reference characters "Tc" denote the period of a clock signal Φ1, and reference characters "Tc/2" denote a period that is half (=½) of the period Tc.

A voltage of 5 V is continuously supplied to the gain line VGK. Further, a clock signal Φ1 for odd-numbered shift thyristors and a clock signal Φ2 for even-numbered shift thyristors are input in the period Tc, and 5 V is supplied for the signal Φs of the start pulse line. A short time before the clock signal Φ1 for odd-numbered shift thyristors first becomes 5 V, the signal Φs of the start pulse line is lowered to 0 V in order to set a potential difference in the gain line VGK. Thereby, the gate potential of the initial shift thyristor Tn−1 is lowered from 5 V to 1.7 V, and the threshold voltage becomes 3.2 V and a state is entered in which the shift thyristor Tn−1 can be turned on by a signal from the transfer line Φ1. After a short delay from a time that 5 V is applied to the transfer line Φ1 and the initial shift thyristor Tn−1 transitions to an "on" state, 5 V is supplied to the start pulse line Φs, and thereafter 5 V is continuously supplied to the start pulse line Φs.

The transfer line Φ1 and transfer line Φ2 have a time period Tov in which "on" states (in this case, 5 V) thereof overlap with each other, and are configured so as to be in a substantially complementary relation with each other. Signals are transmitted in the signal lines ΦW1 to ΦW4 for lighting the light-emitting thyristors at periods that are one-half of the periods of the transfer lines Φ1 and Φ2, and when the corresponding shift thyristor is in an "on" state, the light-emitting thyristors light when 5 V is applied. For example, in a time period a, the state is a state in which all of the four light-emitting thyristors that are connected to the same shift thyristor are lighting, and in a time period b, three light-emitting thyristors are lighting at the same time. Further, in a time period c, all of the light-emitting thyristors are in an extinguished state, and in a time period d, two light-emitting thyristors are lighting at the same time. In a time period e, only one light-emitting thyristor lights.

Although in the present embodiment the number of light-emitting thyristors that are connected to one shift thyristor is taken as four, the present invention is not limited thereto, and the number of light-emitting thyristors connected to one shift thyristor may be less than or greater than four in accordance with the intended use. Note that, although in the description of the aforementioned circuit, a circuit in which a cathode of each thyristor is taken as being common, the present embodiment can also be applied to an anode common circuit by appropriately reversing the polarity.

[Structure of Surface Light Emitting Thyristor]

Figure 13A:
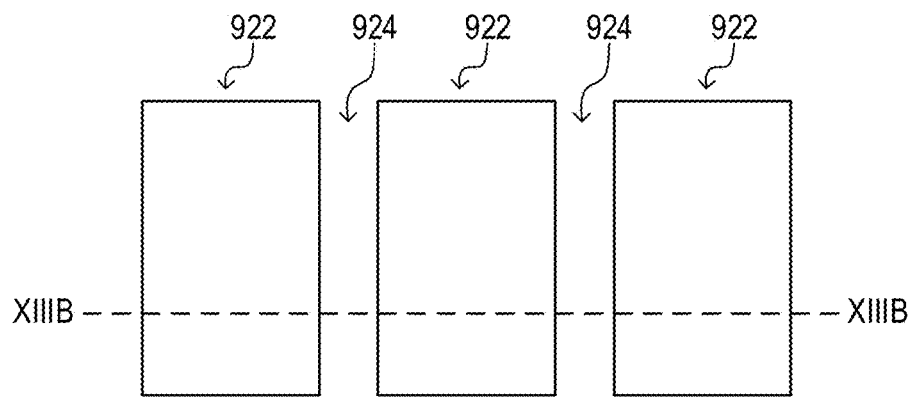
FIG. 13A is a plan view of a light emitting element array.
Figure 13B:
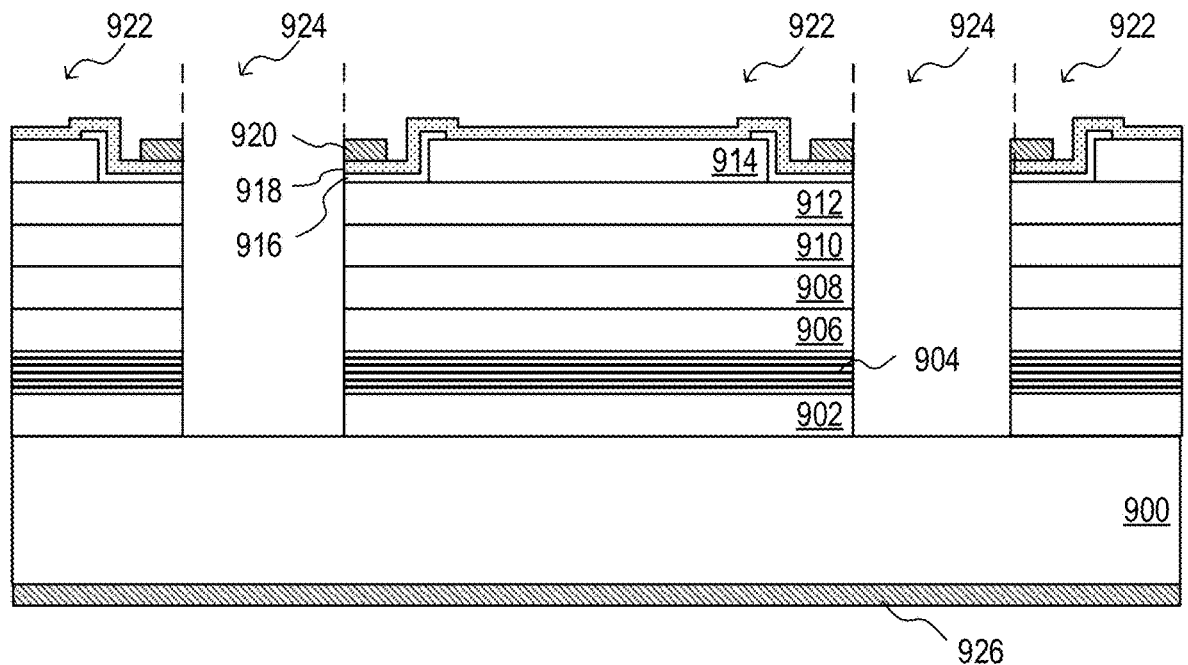
FIG. 13B is a view illustrating a cross-section of a surface light emitting thyristor according to Embodiments 1 and 2.

FIG. 13A and FIG. 13B are schematic diagrams of surface light emitting thyristor portions of the present embodiment. FIG. 13A is a plan view (schematic diagram) of a light emitting element array in which a plurality of light emitting elements that are formed in mesa (trapezoidal) structures 922 are arranged. FIG. 13B is a schematic sectional view obtained when the light emitting elements formed in the mesa structures 922 are cut along a line XIIIB-XIIIB illustrated in FIG. 13A. The mesa structures 922 in which the light emitting elements are formed are disposed at a predetermined pitch (interval between the light emitting elements) (for example, approximately 21.16 µm in the case of a resolution of 1200 dpi), and the respective mesa structures 922 are isolated from each other by device isolation grooves 924.

In FIG. 13B, reference numeral 900 denotes a compound semiconductor substrate of a first conduction type, reference numeral 902 denotes a buffer layer of a first conduction type that is the same conduction type as the substrate 900, and reference numeral 904 denotes a distributed Bragg reflection (DBR) layer that is constituted by laminating two kinds of semiconductor layers of the first conduction type. Further, reference numeral 906 denotes a first semiconductor layer of a first conduction type, reference numeral 908 denotes a first semiconductor layer of a second conduction type that is of a different conduction type from the first conduction type, reference numeral 910 denotes a second semiconductor layer of a first-conduction-type, and reference numeral 912 denotes a second semiconductor layer of a second conduction type. As illustrated in FIG. 13B, a pnpn-type (or npnp-type) thyristor structure is formed by alternatively laminating semiconductors of different conduction types as the semiconductor layers 906, 908, 910 and 912. In the present embodiment, an n-type GaAs substrate is used for the substrate 900, an n-type GaAs or n-type AlGaAs layer is used for the buffer layer 902, and a laminated structure of n-type AlGaAs having a high Al composition and AlGaAs having a low Al composition are used for the DBR layer 904. N-type AlGaAs is used for the first semiconductor layer of a first conduction type 906 on the DBR layer, and p-type AlGaAs is used for the first semiconductor layer of a second conduction type 908. Further, n-type AlGaAs is used for the second semiconductor layer of a first-conduction-type 910, and p-type AlGaAs is used for the second semiconductor layer of a second conduction type 912.

Further, in the mesa-structure-type surface emitting elements, the luminous efficiency is enhanced by using a current constriction mechanism to ensure that a current does not flow to the side faces of the mesa structure 922. The current constriction mechanism according to the present embodiment will now be described. As illustrated in FIG. 13B, a p-type GaP layer 914 is formed on p-type AlGaAs as the second semiconductor layer of a second conduction type 912 in the present embodiment, and an ITO layer 918 that is an n-type transparent conductor is formed on the p-type GaP layer 914. The p-type GaP layer 914 is formed so as to have a sufficiently high impurity concentration at a portion that contacts the ITO layer 918 that is a transparent conductor. When a forward bias is applied to the light-emitting thyristor (for example, when a back-side electrode 926 is grounded and a positive voltage is applied to the surface electrode 920), because a portion of the p-type GaP layer 914 at which the p-type GaP layer 914 contacts the ITO layer 918 that is a transparent conductor is formed with a sufficiently high impurity concentration, a tunnel junction is formed. As a result, a current flows. By means of such a structure, the p-type GaP layer 914 forms a current constriction mechanism that causes the current to concentrate at a portion that contacts the ITO layer 918 that is an n-type transparent conductor. Note that, in the present embodiment, an interlayer insulating layer 916 is provided between the ITO layer 918 and the p-type AlGaAs layer 912. However, a supplementary diode formed with the n-type ITO layer 918 and the p-type AlGaAs layer 912 has a reverse bias with respect to the forward bias of the light-emitting thyristor, and in a forward bias condition, a current basically does not flow other than at the tunnel junction portion. Therefore, if the reverse withstand voltage of the supplementary diode with the n-type ITO layer 918 and the p-type AlGaAs layer 912 is sufficient for the required usage, the interlayer insulating layer 916 can be omitted. According to this configuration, a semiconductor lamination portion at a lower part of a portion that is substantially equivalent to a portion at which the p-type GaP layer 914 and the ITO layer 918 that is an n-type transparent conductor contact emits light, and almost all of the light emission is reflected to the opposite side of the substrate 900 by the DBR layer 904.

In the exposure head 106 in the present embodiment, the density (interval between light emitting elements) of light emitting points is determined according to the resolution. The respective light emitting elements in the surface emitting element array chip are isolated into the mesa structures 922 by the device isolation grooves 924, and for example, in the case of performing image formation at a resolution of 1200 dpi, the light emitting elements are arranged so that the interval between the centers of adjacent light emitting elements (light emitting points) is 21.16 µm.

According to the present embodiment that is described above, dithering at 2400 dpi is performed with respect to a light emitting element interval of 1200 dpi to thereby shift image data in accordance with the amount of color misregistration or the amount of mounting position deviation. Thereby image position control at a higher resolution is enabled, and high quality image formation in which there is little positional deviation with respect to color misregistration or mounting deviations of surface emitting element array chips is enabled. In addition, in the chip data converting portion 403 of the control board 415, when arranging pixel data for each surface emitting element array chip, pixel data of adjacent chips is added and transmitted to the filter processing portion 408. Thereby, when performing resolution conversion at the filter processing portion 408, high quality image formation in which there is no image loss between surface emitting element array chips is enabled. Although in the present embodiment an example has been described in which surface emitting element array chips are arranged in a staggered manner in two rows, processing can be similarly performed in the case of a configuration in which the surface emitting element array chips are arranged in a single row also, and similar effects as in a case where the surface emitting element array chips are arranged in two rows can be obtained. Further, in the case of an exposure head in which the pitch between surface emitting elements corresponds to a resolution of 600 dpi also, by raising the resolution of dithering processing and image shift processing (for example, to 1200 dpi or 2400 dpi), position control for a resolution equal to or greater than the pitch between the light emitting elements is enabled.

As described above, according to the present embodiment, a decline in image quality can be suppressed by correction of image data that corresponds to a resolution that is higher than an arrangement interval of light emitting elements in the arrangement direction of the light emitting elements.

Embodiment 2

In Embodiment 1, a resolution conversion method that interpolates data of adjacent pixels by filter processing was described. According to the aforementioned method, while on one hand the positional accuracy of dots (an image) that is formed improves, on the other hand a latent image at an edge portion is liable to become unstable due to a large amount of halftone data of multiple values being generated at an edge portion in the main scanning direction of the dots (image). Therefore, depending on the image forming conditions (for example, the charging amount of the photosensitive drum 102), a phenomenon whereby the sharpness of an image that is formed is dull may occur. Therefore, according to the present embodiment, an image forming apparatus is described that has a configuration in which resolution conversion is performed in the order of processing the image data described in Embodiment 1, and in which a sharpness priority mode can be selected according to the kind of image or an instruction from a user. In the present embodiment it is assumed that a control board selects the sharpness priority mode based on the kind of image. Further, it is assumed that the image forming apparatus of the present embodiment includes an operation portion (not illustrated), and that a user can set the sharpness priority mode from the operation portion.

Note that, the image forming apparatus that is used in the present embodiment is the same as the image forming apparatus described in Embodiment 1, and the configuration of an exposure head that exposes the photosensitive drum 102 is also the same as the configuration of the exposure head 106 of Embodiment 1. In the present embodiment, as described later, changes to the filter coefficients K1 and K2 are notified to the filter processing portion 408 of the driving portion 303a of the drive board 202 from the CPU 400 of the control board 415. Therefore, in the present embodiment, in the driving portion 303a shown in FIG. 4 of Embodiment 1, signal wires for notifying instructions from the CPU 400 are also added to the filter processing portion 408. With the exception of this point, the configuration of the control board 415 and the drive board 202 is the same as in Embodiment 1. In the following description, components that are the same as in Embodiment 1 are denoted by the same reference characters as in Embodiment 1, and a description of such components is omitted here.

[Sharpness Priority Mode]

In the present embodiment also, similarly to Embodiment 1, the filter processing portion 408 performs interpolation processing by filter processing in the main scanning direction on the image data for each surface emitting element array chip to thereby convert the resolution in the main scanning direction from 2400 dpi to 1200 dpi. According to Embodiment 2, when calculating the data (density data) of a given pixel, a resolution conversion method is used that is an image position priority mode that is first processing that is described later which performs interpolation using data (density data) of pixels adjacent to the pixel in question. FIG. 14 is a view for describing the manner of the filter processing performed by the filter processing portion 408 of the present embodiment. In FIG. 14, reference characters D1 to D9 denote image data (input data values for 2400 dpi) of a surface emitting element array chip. Here, the image data D1 to D8 is image data of the relevant surface emitting element array chip, and the image data D9 is pixel data of endmost portions of adjacent surface emitting element array chips that are mentioned above. Reference characters D1' to D4' denote image data (output data values for 1200 dpi) after performing the filter processing of the filter processing portion 408.

According to the present embodiment, in a case where the sharpness priority mode that is second processing is selected, the values of the filter coefficients K1 and K2 that are used in a filter operation (Formula (1)) performed by the filter processing portion 408 are switched to K1=1.0, K2=0. Switching of the values of the filter coefficients K1 and K2 is executed by rewriting the settings of the K1 and K2 in the filter processing portion 408 by means of an instruction from the CPU 400 of the control board 415. As a result of the filter coefficient K2 that corresponds to an adjacent pixel becoming 0, Formula (1) that calculates image data of each pixel in Embodiment 1 is changed to the following Formula (2), and input data that is at the same main scanning position as the output data is calculated as it is as output data.

$$Dn' = D(2 \times n) \qquad \text{(Formula 2)}$$

Here, n corresponds to 516 that is the number of light emitting elements within each surface emitting element array chip, and calculation of the image data for each light emitting element is performed sequentially in the order of n=1 to 516 based on the lighting sequence of the light emitting elements. By means of Formula (2), the odd-numbered input data D1, D3, D5, D7, and D9 in FIG. 14 is not reflected in output data D1' to D4' and is deleted. Therefore, when the sharpness priority mode is selected, image generation is performed so that the image data generated by the image data generating portion 401 undergoes dot growth in units of two pixels in the main scanning direction.

Figure 15A:
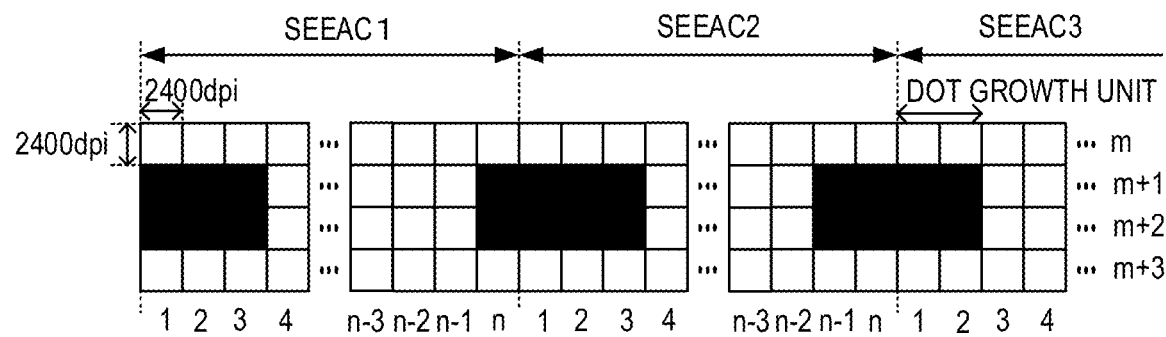
FIG. 15A, FIG. 15B and FIG. 15C are views for describing filter processing in Embodiment 2.

FIG. 15A is a view illustrating image data obtained after performing dithering processing on image data of the surface emitting element array chips (SEEAC) 1, 2 and 3 in units of two pixels in the main scanning direction in the image data generating portion 401 of the control board 415. In the example in FIG. 15A, dots having a size of four pixels in the main scanning direction and two pixels in the sub-scanning direction are formed. In the present embodiment, when forming one dot, a dither matrix is determined so that the width of pixels in the main scanning direction undergoes dot growth in units of two pixels in the manner of 2, 4, 6, 8 . . . . In FIG. 15A, the image data the image data is illustrated in the two tones of black and white. Further, the vertical axis in FIG. 15A represents the sub-scanning direction, and reference characters m to m+3 denote lines in the sub-scanning direction. Further, the horizontal axis in FIG. 15A represents the main scanning direction, and reference numerals 1, 2 . . . n−1 and n denote the arrangement order for a resolution of 2400 dpi of the light emitting elements in the surface emitting element array chip.

Figure 15B:
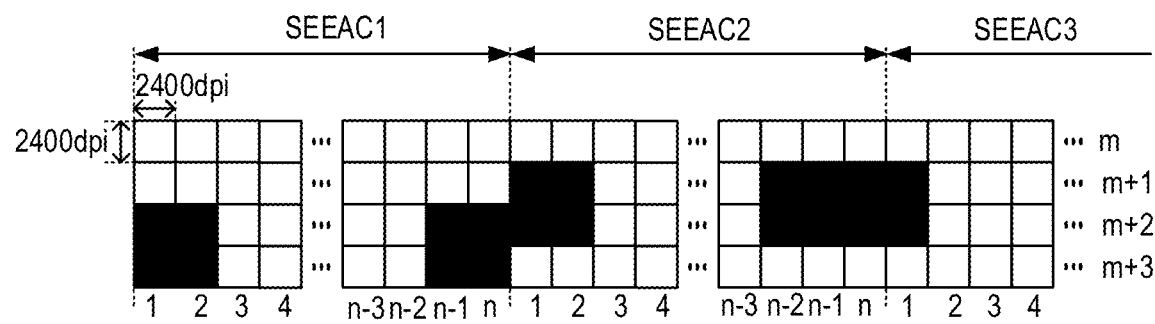
Figure 15C:
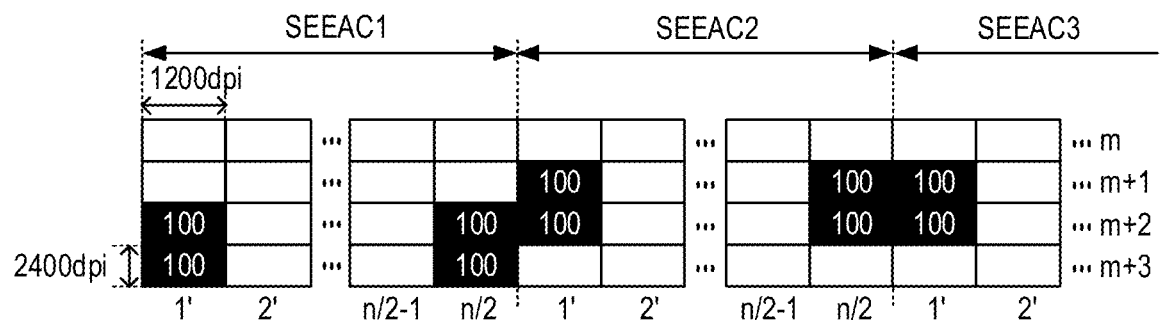

Similarly to Embodiment 1, FIG. 15B is a view illustrating image data after the image data illustrated in FIG. 15A is shifted in 2400 dpi units by the line data shift portion 402 and the chip data shift portion 404 of the control board 415. FIG. 15B illustrates an example of shifting an image by shifting the image data illustrated in FIG. 15A by the amount of one pixel in the left direction in the main scanning direction, and shifting the image data corresponding to the surface emitting element array chip 1 by the amount of one pixel in the downward direction in the sub-scanning direction in array chip units. FIG. 15C illustrates image data that, with respect to the image that was shifted in the main scanning direction and the sub-scanning direction in FIG. 15B, is obtained after the resolution of the image data for the main scanning direction is converted from 2400 dpi to 1200 dpi by the filter processing portion 408 using Formula (2). Note that, reference characters 1', 2' . . . n/2−1, and n in the horizontal axis direction denote the arrangement order of the light emitting elements of the surface emitting element array chip after the resolution is converted to 1200 dpi.

The size in the main scanning direction of each pixel (1200 dpi) after the resolution conversion illustrated in FIG. 15C is twice the size of one pixel (2400 dpi) that is illustrated in FIG. 15B. In addition, with respect to the position of each pixel, although the position is shifted to the right side by the amount of half of a pixel in FIG. 15B (a position that is advanced by one-half of a pixel in the main scanning direction), the centroid position of the image does not change between before and after the resolution conversion. For example, the size and the position of a pixel 1' of the surface emitting element array chip 1 after the resolution conversion in FIG. 15C are as follows. That is, the size and the position of the pixel 1' are a size and a position obtained by adding together half of a pixel at a pixel position 1, a pixel at a pixel position 2 and half of a pixel at a pixel position 3 of the surface emitting element array chip 1 before resolution conversion in FIG. 15B. Similarly, the size and the position of a pixel 2' of the surface emitting element array chip 1 after the resolution conversion in FIG. 15C are a size and a position obtained by adding together half of a pixel at a pixel position 3, a pixel at a pixel position 4 and half of a pixel at a pixel position 5 of the surface emitting element array chip 1 before the resolution conversion in FIG. 15B.

Further, the size and the position of a pixel (n/2−1) of the surface emitting element array chip 1 after the resolution conversion in FIG. 15C are as follows. That is, the size and the position are obtained by adding together half of a pixel at a pixel position (n−3), a pixel at a pixel position (n−2) and half of a pixel at a pixel position (n−1) of the surface emitting element array chip 1 before the resolution conversion in FIG. 15B. Similarly, the size and the position of a pixel (n/2) of the surface emitting element array chip 1 after the resolution conversion in FIG. 15C are as follows. That is, the size and the position are obtained by adding together adding half of a pixel at a pixel position (n−1) and a pixel at a pixel position (n) of the surface emitting element array chip 1 before the resolution conversion in FIG. 15B and also a half of a pixel at a pixel position 1 of the adjacent surface emitting element array chip 2. Note that, the numbers in the respective pixels in FIG. 15C show the density values of the respective pixels. As illustrated in FIG. 15C, according to the present embodiment, gradation data of intermediate tones for which the image density is 75%, 50% or 25% as illustrated in FIG. 8C of Embodiment 1 is not generated, and the gradations after processing take one of two values (100% or 0%).

In the sharpness priority mode, because the density data after filter processing is binary (black or white), a sharp latent image can be formed, in particular, at the edge portion of an image. On the other hand, with respect to the movement accuracy of the image centroid, since the image data is only moved in 1200 dpi units, the movement accuracy of the image position decreases. Therefore, the CPU 400 performs switching of the filter processing that is described above depending on the characteristics of the image, in accordance with the kind of image that is input to the control board 415. For example, in a case where a text or line image is input, the CPU 400 switches to the sharpness priority mode to thereby form a sharp image. On the other hand, in a case where a color image is input, the CPU 400 switches to the image position priority mode to thereby form an image in which the color misregistration is reduced. Here, it is assumed that the image position priority mode uses Formula (1) with the filter coefficients K1=0.5 and K2=0.25 described in Embodiment 1.

Further, the aforementioned switching of the filter processing may be switching in accordance with a change in the image forming conditions other than the kind of image. It is known that in the case of a printer that uses an electrophotographic process, the triboelectricity (electric charge amount) of toner decreases under a high-temperature, high-humidity environment, and as a result the developing performance and transferring performance declines and toner scattering occurs at image edge portions. With respect to such a decrease in the triboelectricity, a method is available that performs control that keeps the image density constant by lowering the charging amount to the photosensitive drum and the output light amount of the exposure head. By selecting the image position priority mode before the triboelectricity of the toner decreases, and selecting the sharpness priority mode after the triboelectricity decreases, a deterioration in the sharpness of image edge portions can be moderated.

In the present embodiment, a method has been described that switches the filter coefficients between the image position priority mode (K1=0.5, K2=0.25) and the sharpness priority mode (K1=1, K2=0). It is not necessarily required to use the aforementioned values as the coefficient values of the coefficients K1 and K2, and coefficient values that satisfy the following Formula (3) and Formula (4) may also be used.

$K1$ value of sharpness priority mode $> K1$ value of image position priority mode (Formula 3)

$K2$ value of sharpness priority mode $< K2$ value of image position priority mode (Formula 4)

Other Embodiments

Figure 16:
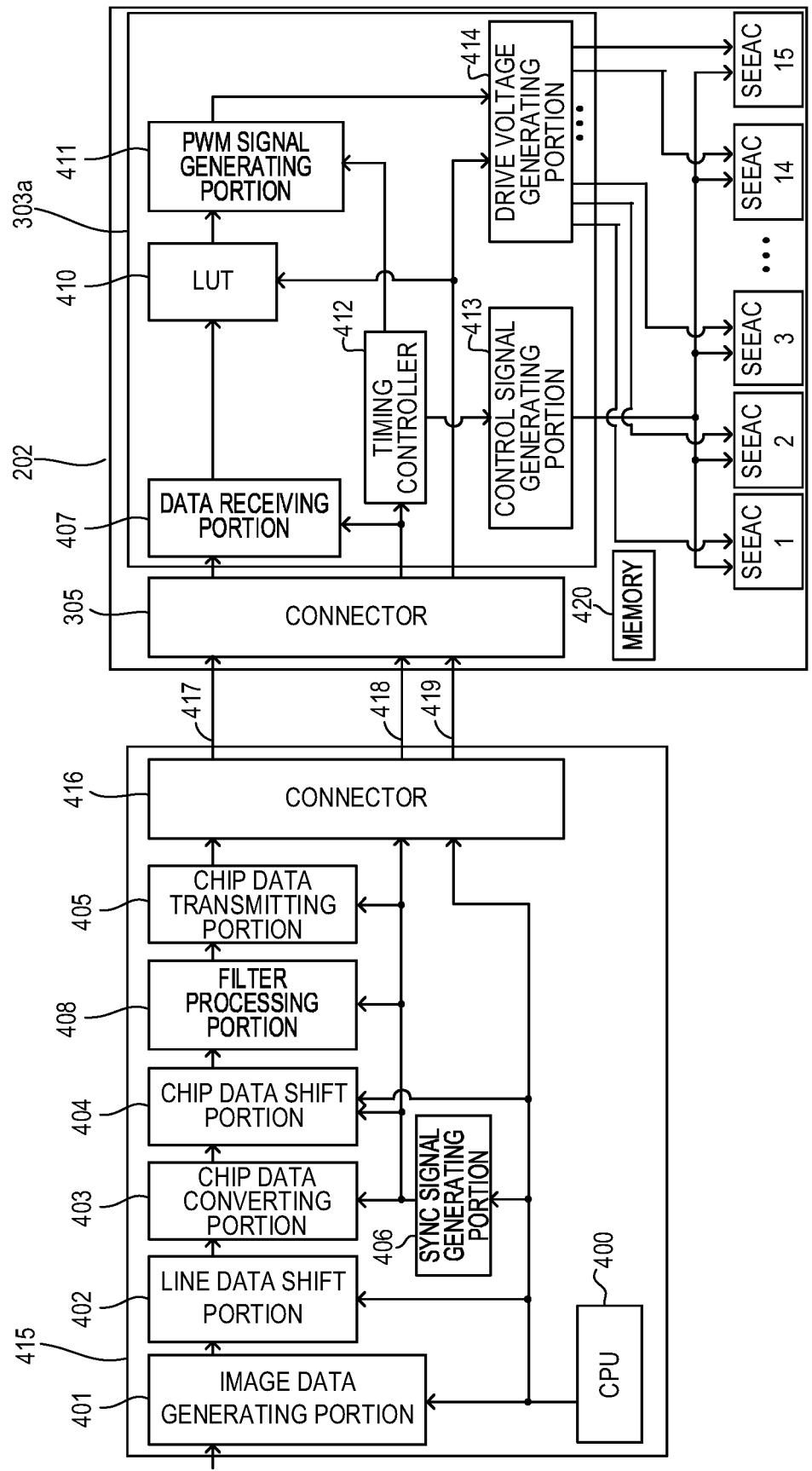
FIG. 16 is a control block diagram of a control board and a drive circuit board according to another embodiment.

As another embodiment, FIG. 16 is a control block diagram of the control board 415 and the drive board 202 having a different configuration from the control block diagram illustrated in FIG. 4 of Embodiment 1. In FIG. 4 of Embodiment 1, the filter processing portion 408 is disposed inside the driving portion 303a of the drive board 202. In FIG. 16, the filter processing portion 408 is provided inside the control board 415, and is disposed between the chip data shift portion 404 and the chip data transmitting portion 405. Thus, for the control board 415, a configuration may be adopted that transmits pixel data that was subjected to filter processing by the filter processing portion 408 to the drive board 202.

Figure 17:
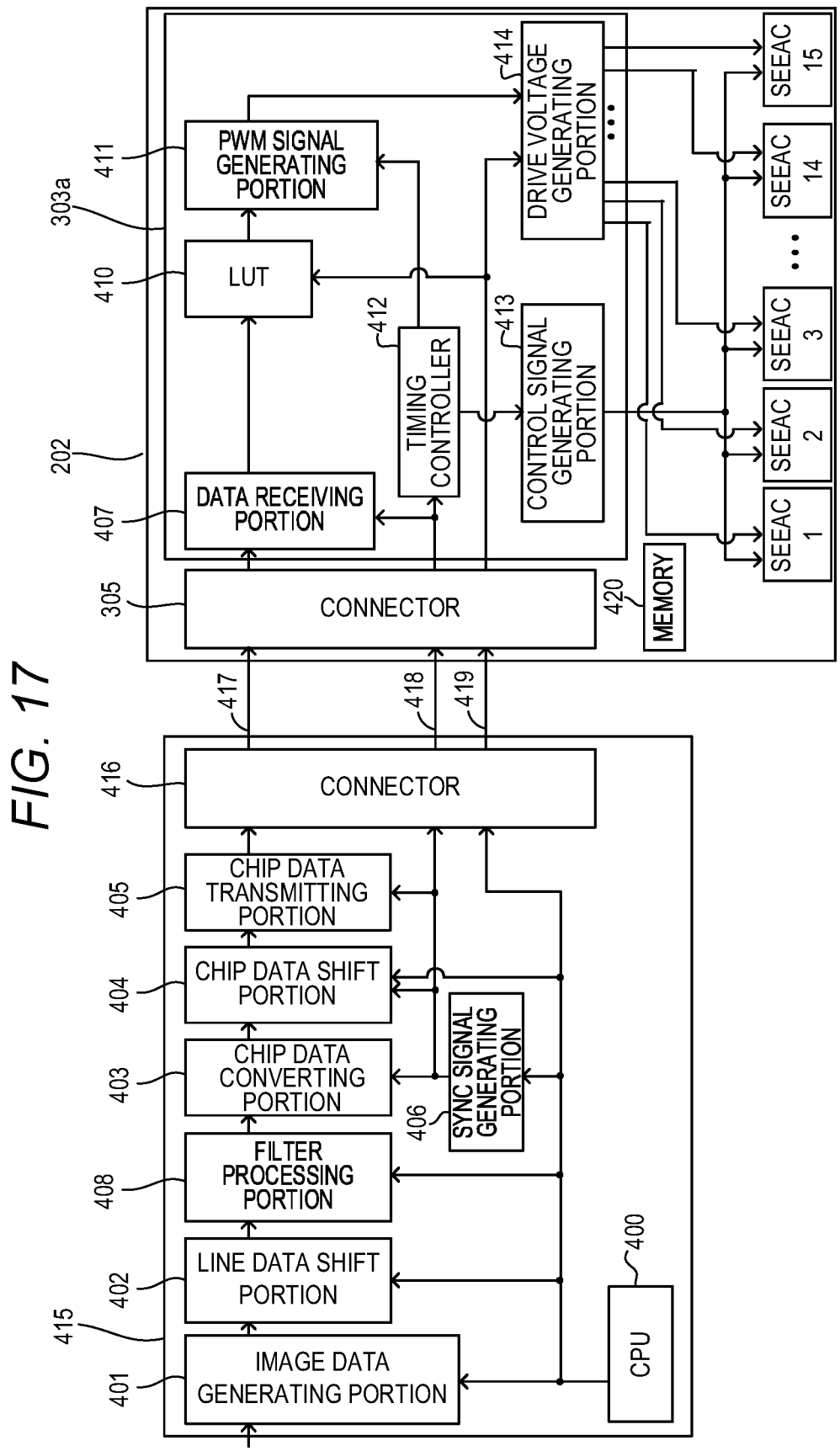
FIG. 17 is a control block diagram of a control board and a drive circuit board according to another embodiment.

FIG. 17 is a control block diagram of the control board 415 and the drive board 202 according to another embodiment that is different from the embodiment of FIG. 16 and Embodiment 1 that are described above. In FIG. 4 of Embodiment 1, the filter processing portion 408 is disposed inside the driving portion 303a of the drive board 202. In FIG. 17, the filter processing portion 408 is provided inside the control board 415, and is disposed between the line data shift portion 402 and the chip data converting portion 403. Thus, for the control board 415, a configuration may be adopted that transmits pixel data that was subjected to filter processing by the filter processing portion 408 to the drive board 202.

As described above, according to the present embodiment, by switching the settings of the image data generating portion 401 and the filter processing portion 408, selection of the sharpness priority mode and the image position priority mode is enabled by a simple method. As a result, output of an optimal image is enabled by switching in accordance with the kind of image and the image forming conditions of the image forming apparatus.

As described above, according to the present embodiment, a decrease in image quality can be suppressed by correction of image data that corresponds to a resolution that is higher than an arrangement interval for light emitting elements in the arrangement direction of the light emitting elements.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-115230, filed Jun. 18, 2018, which is hereby incorporated by reference herein in its entirety.

What is claimed is:

1. An image forming apparatus comprising:
a rotatable photosensitive member;
an exposure head including a plurality of light emitting elements, wherein the exposure head is configured to form an image at a first resolution corresponding to an arrangement interval of the plurality of light emitting elements in an intersecting direction which intersects a rotation direction of the photosensitive member, the light emitting elements arranged at different positions from each other in the intersecting direction to expose the photosensitive member;
a data generating unit configured to generate pixel data, based on input image data, which associates pixel data of a second resolution with respective positions of pixels of the first resolution in the intersecting direction, the second resolution being higher than the first resolution;
a correction unit configured to correct associations between respective pieces of the pixel data generated by the data generating unit and the respective positions of the pixels in the intersecting direction in order to adjust a forming position of an image in the intersecting direction;
a conversion unit configured to convert the plurality of pieces of pixel data that correspond to the second resolution, of which the associations are corrected by the correction unit, to a plurality of pieces of pixel data that correspond to the first resolution, corresponding to the positions of the pixels in the intersecting direction; and
a drive unit configured to drive each of the plurality of light emitting elements corresponding to a position of each piece of the pixel data that corresponds to the first resolution, based on the pixel data of each pixel that corresponds to the first resolution, converted by the conversion unit.

2. The image forming apparatus according to claim 1, wherein the conversion unit is configured to obtain image data of a pixel at the first resolution after conversion by using a value that is obtained by multiplying image data of the pixel at the second resolution before conversion by a first coefficient, and by using a value that is obtained by multiplying pixel data of a pixel adjacent to the pixel at the second resolution by a second coefficient.

3. The image forming apparatus according to claim 2, wherein the conversion unit is configured to switch between a first processing which obtains the image data of the pixel at the first resolution after the conversion by interpolation of image data of a pixel adjacent to the pixel before the conversion, and a second processing which obtains the image data of the pixel at the first resolution after the conversion without the interpolation of the image data of the pixel adjacent to the pixel before the conversion, and
wherein the conversion unit is configured to switch to the first processing or the second processing by switching a setting of the first coefficient and the second coefficient.

4. The image forming apparatus according to claim 3, wherein the first coefficient in the second processing is greater than the first coefficient in the first processing, and
wherein the second coefficient in the second processing is less than the second coefficient in the first processing.

5. The image forming apparatus according to claim 4, wherein a sum of the first coefficient and two of the second coefficients is 1.

6. The image forming apparatus according to claim 5, wherein the light emitting elements are arranged at an interval corresponding to the first resolution, and
wherein image data of a pixel of a light emitting element at an end portion of the light emitting elements in the first processing is interpolated by image data of a pixel of a light emitting element at an end portion of light emitting elements adjacent to the light emitting element at the end portion of the light emitting elements.

7. The image forming apparatus according to claim 1, wherein the exposure head exposes the photosensitive member at the second resolution in the rotation direction, and exposes the photosensitive member at the first resolution in the intersecting direction.

8. The image forming apparatus according to claim 7, further comprising a detection unit configured to detect an amount of color misregistration in the rotation direction and an amount of color misregistration in the intersecting direction of an image formed on the photosensitive member by the exposure head,
wherein the correction unit is configured to correct a color misregistration in the rotation direction and a color misregistration in the intersecting direction of the image data generated by the data generating unit, based on the amount of color misregistration in the rotation direction and the amount of color misregistration in the intersecting direction detected by the detection unit.

9. The image forming apparatus according to claim 8, further comprising a storage unit configured to store an amount of positional deviation of the light emitting elements with respect to the photosensitive member in the intersecting direction,
wherein the correction unit is configured to correct the image data of which the color misregistration in the rotation direction and the color misregistration in the intersecting direction are corrected, based on the amount of positional deviation stored in the storage unit.

10. The image forming apparatus according to claim 9, wherein the light emitting elements of the exposure head are arranged in two rows in the rotation direction, and
wherein an interval in the intersecting direction between the light emitting elements that are arranged in each row is an integer multiple of the second resolution.

11. The image forming apparatus according to claim 1, wherein the light emitting elements are LED elements.

* * * * *